US012702928B2

(12) United States Patent
Kuroda et al.

(10) Patent No.: US 12,702,928 B2
(45) Date of Patent: Aug. 11, 2026

(54) INFORMATION STORAGE MEDIUM, INFORMATION PROCESSING SYSTEM, AND INFORMATION PROCESSING METHOD

(71) Applicant: CYGAMES, INC., Tokyo (JP)

(72) Inventors: Toshio Kuroda, Tokyo (JP); Dai Kikuchi, Tokyo (JP); Tomohiro Hasegawa, Tokyo (JP)

(73) Assignee: CYGAMES, INC., Tokyo (JP)

( * ) Notice: Subject to any disclaimer, the term of this patent is extended or adjusted under 35 U.S.C. 154(b) by 282 days.

(21) Appl. No.: 18/404,494

(22) Filed: Jan. 4, 2024

(65) Prior Publication Data

US 2024/0139633 A1 May 2, 2024

Related U.S. Application Data

(63) Continuation of application No. PCT/JP2022/026980, filed on Jul. 7, 2022.

(30) Foreign Application Priority Data

Jul. 8, 2021 (JP) ................................ 2021-113331

(51) Int. Cl.

*A63F 13/69* (2014.01)
*A63F 13/533* (2014.01)
*A63F 13/58* (2014.01)

(52) U.S. Cl.

CPC ............ *A63F 13/69* (2014.09); *A63F 13/533* (2014.09); *A63F 13/58* (2014.09)

(58) Field of Classification Search

None

See application file for complete search history.

(56) References Cited

U.S. PATENT DOCUMENTS

2019/0030440 A1* 1/2019 Saito ........................ A63F 13/35
2019/0035226 A1* 1/2019 Sato ........................ A63F 13/69

(Continued)

FOREIGN PATENT DOCUMENTS

JP 6284107 B1 2/2018

OTHER PUBLICATIONS (Cubist Co., Ltd. Final Fantasy XIV: Heavensward, Crafter & Gatherer & Gold Saucer Official Guide, first edition, Square Enix Co., Ltd.) non-official translation; pp. 4, 5, 10; Mar. 31, 2016 (25 pages).

(Continued)

*Primary Examiner* — Ronald Laneau

(74) *Attorney, Agent, or Firm* — Osha Bergman Watanabe & Burton LLP

(57) ABSTRACT

The present invention provides a program, an information processing system, and an information processing method capable of increasing the diversity of rewards that can be obtained when game mediums are consumed, thus making it possible to attract a player's interest.

The content of a reward that can be obtained when a character that satisfies a recruitment condition(s) set for each mission is consumed is set on the basis of the status linked with the character, and the content of a reward for a character that is specified as a consumption target is displayed in a character selection screen that serves as an input interface for accepting an input for specifying a character as a consumption target.

7 Claims, 18 Drawing Sheets

(56) References Cited

U.S. PATENT DOCUMENTS

2023/0094057 A1* 3/2023 Takahashi ............. A63F 13/795
463/40
2023/0191257 A1* 6/2023 Ide ........................ A63F 13/822
463/23
2023/0381657 A1* 11/2023 Akitsu .................... A63F 13/69

OTHER PUBLICATIONS

International Search Report issued in International Application No. PCT/JP2022/026980, mailed Sep. 20, 2022 (7 pages).
Written Opinion issued in International Application No. PCT/JP2022/026980; Dated Sep. 20, 2022 (4 pages).

* cited by examiner

FIG. 4

| MISSION ID | LEVEL OF DIFFICULTY | NUMBER OF TIMES | RECRUITMENT REQUIREMENTS | RECRUITMENT CONDITIONS | RANK | REWARD |
|---|---|---|---|---|---|---|
| 34001 | ★★★★☆ | ONE TIME | WANTED IS CHARACTER THAT IS GOOD AT POSITIONING IN MIDDLE DISTANCE | DISTANCE APTITUDE: MIDDLE DISTANCE "A" OR HIGHER<br>SPEED "B+" OR HIGHER<br>SKILL "XXXX" IS POSSESSED | G OR HIGHER (0~) | PIECE OF CHARACTER TO BE TRANSFERRED × 5 |
| 13002 | ★★★☆☆ | ONE TIME | WANTED IS CHARACTER THAT IS GOOD AT STARTING IN SHORT DISTANCE | DISTANCE APTITUDE: SHORT DISTANCE "A" OR HIGHER<br>SPEED "S" OR HIGHER<br>SKILL "XXXXXX" IS POSSESSED | G OR HIGHER (0~) | CHARACTER LOTTERY TICKET |
| 22003 | ★★☆☆☆ | THREE TIMES | WANTED IS CHARACTER THAT IS GOOD IN MILE | DISTANCE APTITUDE: MILE "A" OR HIGHER<br>SPEED "B" OR HIGHER | B OR HIGHER (6500~) | ENHANCEMENT POINTS ×8000<br>IN-GAME CURRENCY ×10000 |
| | | | | | C+ OR HIGHER (4900~) | ENHANCEMENT POINTS ×5000<br>IN-GAME CURRENCY ×10000 |
| | | | | | LESS THAN C+ (~4899) | IN-GAME CURRENCY ×10000 |
| 41006 | ★☆☆☆☆ | FIVE TIMES | WANTED IS CHARACTER THAT HAS TALENT FOR LONG DISTANCE | DISTANCE APTITUDE: LONG DISTANCE "B" OR HIGHER<br>STAMINA "C" OR HIGHER<br>GUTS "D" OR HIGHER | B OR HIGHER (6500~) | ENHANCEMENT POINTS ×5000<br>IN-GAME CURRENCY ×5000 |
| | | | | | C+ OR HIGHER (4900~) | ENHANCEMENT POINTS ×3000<br>IN-GAME CURRENCY ×5000 |
| | | | | | LESS THAN C+ (~4899) | IN-GAME CURRENCY ×5000 |

FIG. 5

| MISSION ID | LEVEL OF DIFFICULTY | NUMBER OF TIMES | RECRUITMENT REQUIREMENTS | RECRUITMENT CONDITIONS | RANK | REWARD |
|---|---|---|---|---|---|---|
| 54001 | ★★★★☆ | ONE TIME | WANTED IS CHARACTER THAT HAS WON SPRING SENIOR TRIPLE CROWN | TITLE "SPRING SENIOR TRIPLE CROWN" IS POSSESSED | G OR HIGHER (0~) | PIECE OF CHARACTER TO BE TRANSFERRED × 5 |
| 23002 | ★★★☆☆ | ONE TIME | WANTED IS CHARACTER THAT HAS ACCELERATION PERFORMANCE IN MILE | DISTANCE APTITUDE: MILE "A" OR HIGHER<br>SPEED "S" OR HIGHER<br>SKILL "XXXXXX" IS POSSESSED | G OR HIGHER (0~) | SUPPORT LOTTERY TICKET |
| 32005 | ★★☆☆☆ | THREE TIMES | WANTED IS CHARACTER THAT IS GOOD IN MIDDLE DISTANCE | DISTANCE APTITUDE: MIDDLE DISTANCE "A" OR HIGHER<br>SPEED "C+" OR HIGHER<br>STAMINA "C" OR HIGHER | B OR HIGHER (6500~) | ENHANCEMENT POINTS ×8000<br>IN-GAME CURRENCY ×10000 |
| | | | | | C+ OR HIGHER (4900~) | ENHANCEMENT POINTS ×5000<br>IN-GAME CURRENCY ×10000 |
| | | | | | LESS THAN C+ (~4899) | IN-GAME CURRENCY ×10000 |
| 11004 | ★☆☆☆☆ | FIVE TIMES | WANTED IS CHARACTER THAT HAS TALENT FOR SHORT DISTANCE | DISTANCE APTITUDE: SHORT DISTANCE "B" OR HIGHER<br>SPEED "C" OR HIGHER | B OR HIGHER (6500~) | ENHANCEMENT POINTS ×5000<br>IN-GAME CURRENCY ×5000 |
| | | | | | C+ OR HIGHER (4900~) | ENHANCEMENT POINTS ×3000<br>IN-GAME CURRENCY ×5000 |
| | | | | | LESS THAN C+ (~4899) | IN-GAME CURRENCY ×5000 |

INFORMATION STORAGE MEDIUM, INFORMATION PROCESSING SYSTEM, AND INFORMATION PROCESSING METHOD

CROSS-REFERENCE TO RELATED APPLICATIONS

This application is a continuation of International Patent Application No. PCT/JP2022/026980, having an international filing date of Jul. 7, 2022, which designated the United States, the entirety of which is incorporated herein by reference. Japanese Patent Application No. 2021-113331 filed on Jul. 8, 2021 is also incorporated herein by reference in its entirety.

BACKGROUND OF THE INVENTION

The present invention relates to an information storage medium, an information processing system, and an information processing method for a game in which a game medium possessed by a player is consumed to get a reward.

In the related art, there are known training games in which a game medium such as a character is trained, and a function of consuming a game medium for which training has been completed, to get a reward, exists as one game function of such games (see Publication of Japanese Patent No. 6284107).

However, in the conventional function of consuming a game medium to get a reward, the content of a reward that can be obtained when a game medium is consumed is set in accordance with a condition for getting the reward, thus resulting in a lack of diversity of the content of rewards and making it impossible to sufficiently attract a player's interest.

SUMMARY OF THE INVENTION

The present invention has been made in view of the above-described circumstances, and an object thereof is to provide an information storage medium, an information processing system, and an information processing method capable of increasing the diversity of rewards that can be obtained when game media are consumed, thus making it possible to attract a player's interest.

According to a first aspect of the invention, there is provided a non-transitory computer-readable information storage medium storing a program for a game in which a game medium possessed by a player is consumed to get a reward, the program causing a computer to function as:

a specific-condition setting unit that sets a specific condition that should be satisfied by the game medium in order to get the reward;

a reward-content setting unit that sets the content of the reward on the basis of information linked with the game medium, which satisfies the specific condition; and a reward giving unit that gives the reward on the basis of the fact that an input for deciding consumption of the game medium, which satisfies the specific condition, is performed.

According to a second aspect of the invention, there is provided an information processing system for a game in which a game medium possessed by a player is consumed to get a reward, the information processing system comprising:

a specific-condition setting unit that sets a specific condition that should be satisfied by the game medium in order to get the reward;

a reward-content setting unit that sets the content of the reward on the basis of information linked with the game medium, which satisfies the specific condition; and a reward giving unit that gives the reward on the basis of the fact that an input for deciding consumption of the game medium, which satisfies the specific condition, is performed.

According to a third aspect of the invention, there is provided a information processing method for a game in which a game medium possessed by a player is consumed to get a reward, the information processing method comprising:

a specific-condition setting step for setting a specific condition that should be satisfied by the game medium in order to get the reward;

a reward-content setting step for setting the content of the reward on the basis of information linked with the game medium, which satisfies the specific condition; and a reward giving step for giving the reward on the basis of the fact that an input for deciding consumption of the game medium, which satisfies the specific condition, is performed.

BRIEF DESCRIPTION OF DRAWINGS

FIG. 4 is a view showing an example of setting of missions related to the game function of consuming a character to get a reward.

FIG. 5 is a view showing an example of setting of missions related to the game function of consuming a character to get a reward.

Figure 1:
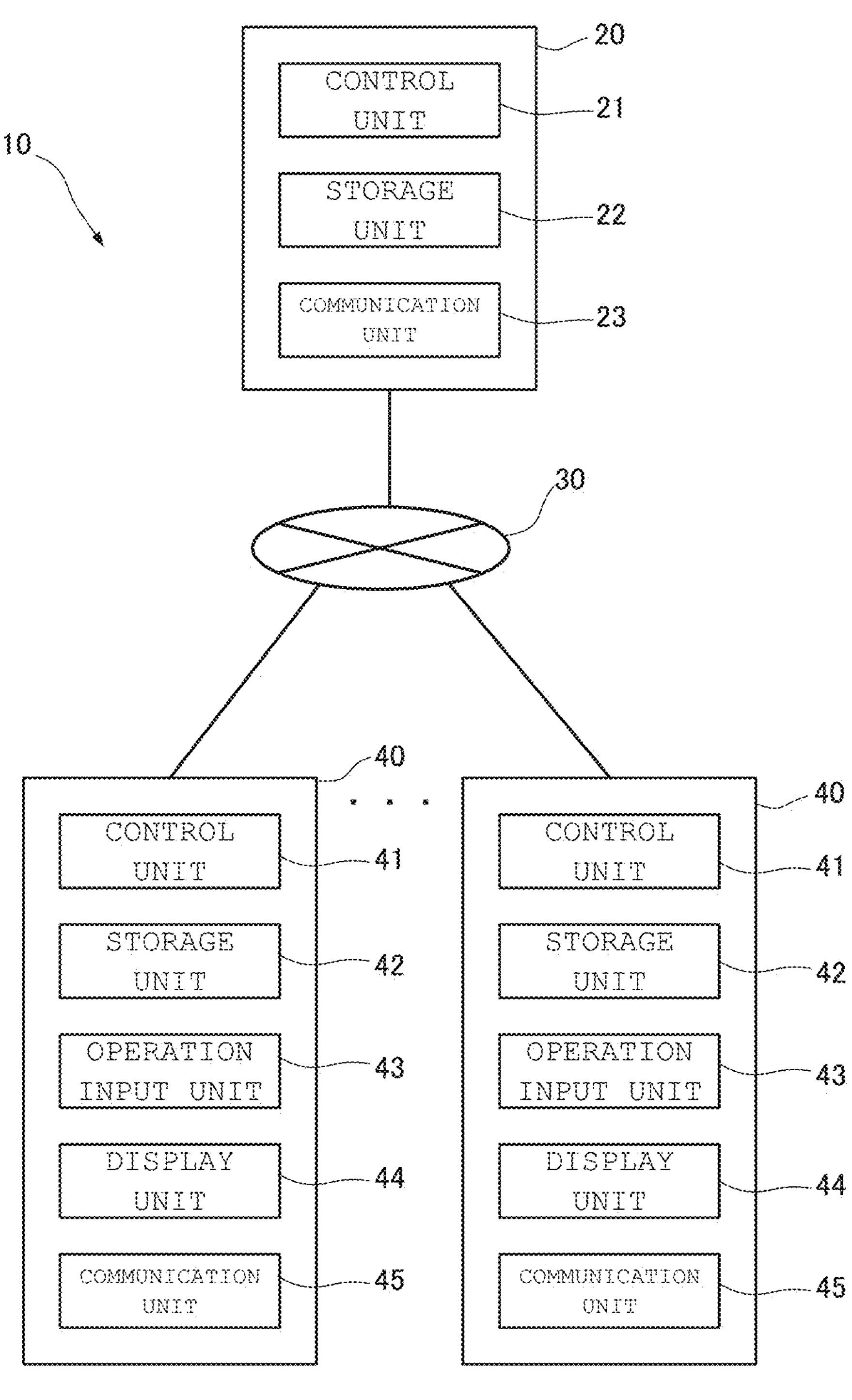
FIG. 1 is a view showing the overall configuration of an information processing system.

DETAILED DESCRIPTION OF THE INVENTION (1) The present embodiment relates to a non-transitory computer-readable information storage medium storing a program for a game in which a game medium possessed by a player is consumed to get a reward, the program causing a computer to function as: a specific-condition setting unit that sets a specific condition that should be satisfied by the game medium in order to get the reward; a reward-content setting unit that sets the content of the reward on the basis of information linked with the game medium, which satisfies the specific condition; and a reward giving unit that gives the reward on the basis of the fact that an input for deciding consumption of the game medium, which satisfies the specific condition, is performed.

(2) In the information storage medium according to the present embodiment, the program may cause the computer to function as an input accepting unit that provides a consumption-target specification screen that serves as an input interface for accepting an input for specifying, as a consumption target, the game medium possessed by the player, wherein the input accepting unit may display the content of the reward for the game medium specified as the consumption target, in the consumption-target specification screen.

(2) In the information storage medium according to the present embodiment, the input accepting unit may make, among a plurality of game media possessed by the player, a game medium, which does not satisfy the specific condition, unable to be specified as the consumption target, in the consumption-target specification screen.

(3) In the information storage medium according to the present embodiment, the program may have another game mode in which a status of the game medium is made to change in accordance with progression of the game and in which the status of the game medium is determined in the case where the degree of progression of the game satisfies a predetermined completion condition; and the specific-condition setting unit may set the specific condition in association with the status.

(4) In the information storage medium according to the present embodiment, the program may have another game mode in which a status of the game medium is made to change in accordance with progression of the game and in which the status of the game medium is determined in the case where the degree of progression of the game satisfies a predetermined completion condition; and the reward-content setting unit may set the content of the reward by using the status determined in the other game mode as information linked with the game medium.

(5) In the information storage medium according to the present embodiment, the reward-content setting unit may set the content of the reward for the game medium by performing predetermined lottery processing based on information linked with the game medium.

(6) The present embodiment relates to an information processing system for a game in which a game medium possessed by a player is consumed to get a reward, the information processing system including: a specific-condition setting unit that sets a specific condition that should be satisfied by the game medium in order to get the reward; a reward-content setting unit that sets the content of the reward on the basis of information linked with the game medium, which satisfies the specific condition; and a reward giving unit that gives the reward on the basis of the fact that an input for deciding consumption of the game medium, which satisfies the specific condition, is performed.

(7) The present embodiment relates to an information processing method for a game in which a game medium possessed by a player is consumed to get a reward, the information processing method including: a specific-condition setting step for setting a specific condition that should be satisfied by the game medium in order to get the reward; a reward-content setting step for setting the content of the reward on the basis of information linked with the game medium, which satisfies the specific condition; and a reward giving step for giving the reward on the basis of the fact that an input for deciding consumption of the game medium, which satisfies the specific condition, is performed.

With the information storage medium, the information processing system, and the information processing method, which are described above, since a reward can be obtained in the case where a game medium that satisfies a specific condition is consumed, and, on the basis of information linked with the game medium that satisfies the specific condition, the content of the reward that can be obtained when the game medium is consumed is set, it is possible to increase the diversity of obtainable rewards, thus enabling to attract a player's interest.

Furthermore, with the information storage medium, the information processing system, and the information processing method, which are described above, although there is a fear that confirmation of the content of rewards becomes complicated as a result of increasing the diversity of obtainable rewards, the content of a reward for a game medium specified as a consumption target is displayed in a consumption-target specification screen that serves as an input interface for accepting an input for specifying a game medium as a consumption target, thereby making it possible for the player to select the consumption target while confirming the content of the reward and to enhance the convenience for the player to perform an input.

Embodiments of the present invention will be described below. Note that the embodiments to be described below do not unreasonably limit the content of the invention described in the scope of the patent claims. Furthermore, all the configurations described in this embodiment are not necessarily indispensable constituent features of the present invention.

1. Configuration of Information Processing System

FIG. 1 is a view showing the overall configuration of an information processing system 10 of this embodiment. As shown in FIG. 1, in the information processing system 10, a server 20 and a plurality of player terminals 40 are connected by a network 30, such as the Internet, a mobile telephone network, a LAN, or a WAN, whereby a so-called client-server communication system is configured. Then, each of the plurality of player terminals 40 communicates with the server 20 via the network 30 to send and receive various kinds of information. Each of the plurality of player terminals 40 communicates with the other player terminal(s) 40 via the network 30 and the server 20 to send and receive various kinds of information.

The server 20 includes: a control unit 21 that is configured of a processor such as a CPU; a storage unit 22 that is configured of a main storage device such as a ROM or a RAM and an auxiliary storage device such as an HDD or an SSD; and a communication unit 23 that is configured of a communication module or a communication interface. In the server 20, the control unit 21 executes various kinds of processing according to a program stored in the storage unit 22. Furthermore, the server 20 receives information from the player terminals 40 and sends information etc. related to the result of processing executed by the control unit 21 to the player terminals 40, by means of the communication unit 23.

The player terminals 40 are smartphones, tablets, personal computers, handheld game consoles, installed game consoles installed at stores or in homes, or the like. The player terminals 40 each include: a control unit 41 that is configured of a processor such as a CPU; a storage unit 42 that is configured of a main storage device such as a ROM or a RAM and an auxiliary storage device such as a flash memory, an HDD, or an SSD; an operation input unit 43 that is configured of a touchscreen, a keyboard, a microphone, etc.; a display unit 44 that is configured of a liquid crystal display, an organic EL display, or the like; and a communication unit 45 that is configured of a communication module or a communication interface. The player terminal 40 also executes various kinds of processing according to a program stored in the storage unit 42. Furthermore, the player terminal 40 receives information from the server 20 and sends information to the server 20 or the other player terminal(s) 40, by means of the communication unit 45.

Figure 2:
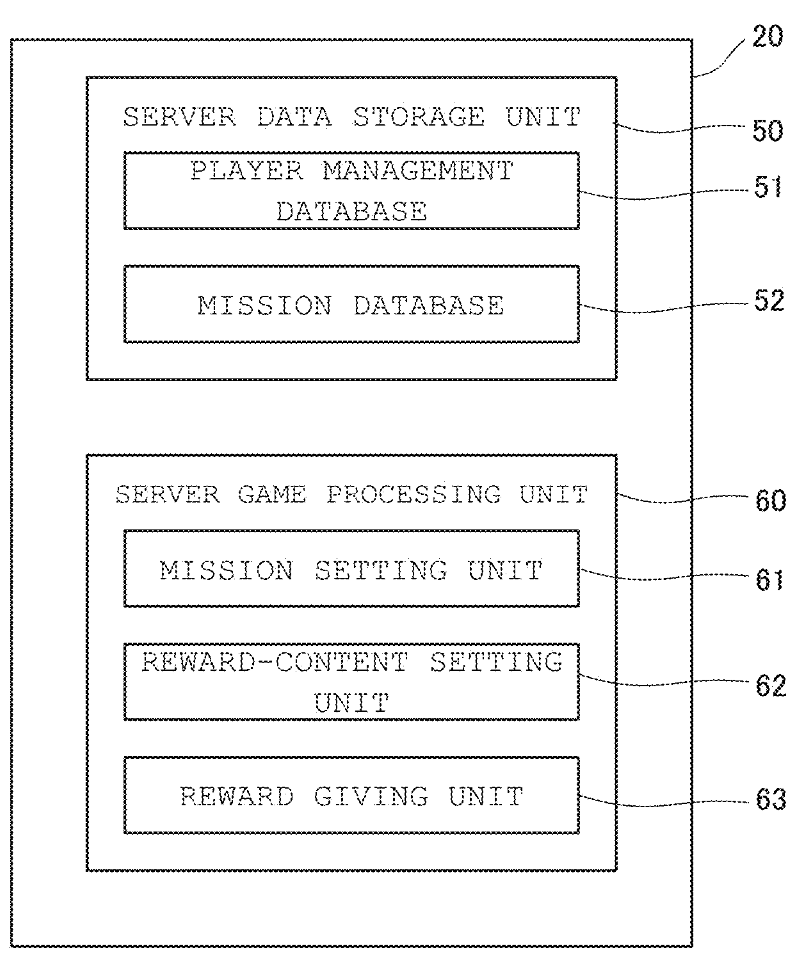
FIG. 2 is a functional block diagram of a server, related to a game function of consuming a character to get a reward, among functions realized by the information processing system.
Figure 3:
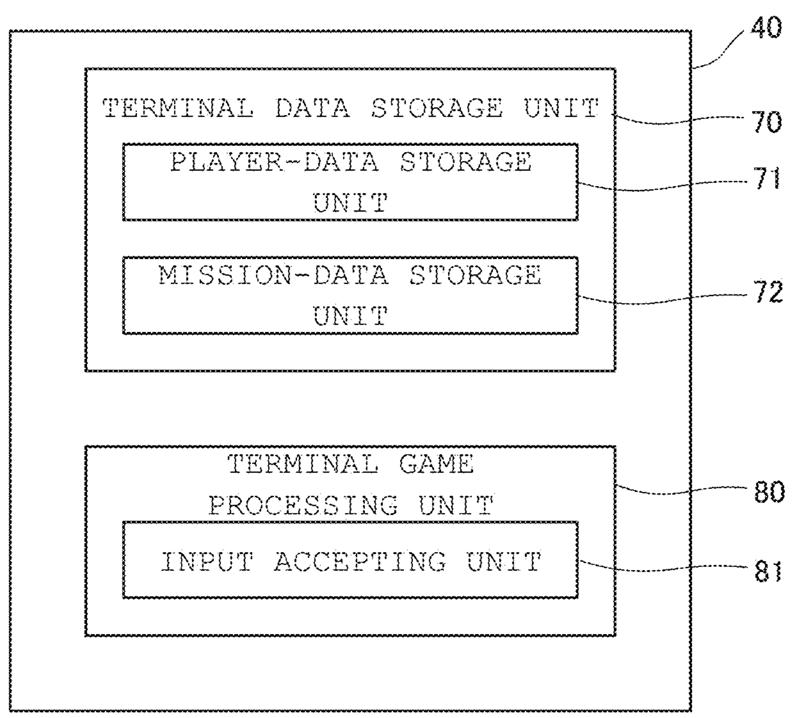
FIG. 3 is a functional block diagram of a player terminal, related to the game function of consuming a character to get a reward, among functions realized by the information processing system.

FIG. 2 is a functional block diagram showing main functions of the server 20. Furthermore, FIG. 3 is a functional block diagram showing main functions of the player terminal 40.

The information processing system of this embodiment has a function of providing, via the player terminals 40, a racing game in which characters with motifs of racehorses are trained and in which a character that is being trained or a character for which training is finished is made to run a race to compete for order of finish with other characters.

Furthermore, the information processing system of this embodiment has a special-transfer function of getting a reward by consuming a character (one example of a game medium) for which training is finished and also has a function of setting recruitment conditions (one example of a specific condition) that should be satisfied by a character in order to get a reward(s), a function of setting the content of a reward(s) on the basis of the statuses of a character that satisfies the recruitment conditions, a function of providing an input interface for accepting an input for specifying a character as a consumption target, and a function of giving a reward(s) on the basis of the fact that an input for deciding consumption of a character that satisfies the recruitment conditions is performed. In this embodiment, a description will be given of a case in which these functions are realized collaboratively by the server 20 and the player terminal 40. However, the above-mentioned functions may also be realized mainly by the player terminal 40. Furthermore, in this embodiment, a description will be given on the assumption that, hereinafter, consumption of a character is referred to as "transfer".

First, in the server 20, as shown in FIG. 2, a server data storage unit 50 and a server game processing unit 60 collaborate to realize a function of setting recruitment conditions that should be satisfied by a character in order to get a reward(s) and a function of setting the content of a reward(s) on the basis of the statuses of a character that satisfies the recruitment conditions.

The server data storage unit 50 stores data used when the server game processing unit 60 performs various kinds of processing, and is mainly realized by the storage unit 22.

Furthermore, the server data storage unit 50 includes a player management database 51, and the player management database 51 stores a character list and an item list in linkage with a player ID given to each player.

The character list includes, for example, a character individual ID given to each trained character, a character type ID indicating the type of a character, the statuses (rarity, evaluation points, course aptitude, distance aptitude, racing-style aptitude, running style, speed, stamina, power, guts, and cleverness, possessed skills, and obtained titles) of a character, the lock state (locked or unlocked), and training history of a character (training conditions, and records of races during training).

In this embodiment, a "trained character" means a character of which the statuses are determined after training of the character is completed by means of a training function that is one of the game functions realized by the information processing system of this embodiment.

Furthermore, although the "character individual ID" and the "character type ID" are used in this embodiment, the difference therebetween is as follows.

First, the "character individual ID" is given when a trained character, for which training is completed in the training function, is registered in the character management database 51, and is used to identify the individual trained character linked with the player ID.

Furthermore, this embodiment has specifications in which the player selects a training target from among a plurality of types of characters in the training function. The "character type ID" is given in order to identify the type of a trained character.

Furthermore, the "lock state" indicates whether transfer of a trained character is prohibited or not, transfer is possible when the lock state indicates unlocked, and transfer is impossible when the lock state indicates locked. Situations in which the lock state indicates locked include a case where the player individually specifies a character from a list of trained characters, a case where a trained character is registered for running in a race, etc.

The item list includes data related to items, enhancement points, and in-game currency that are possessed by the player. In this embodiment, for example, the possessed content and the possessed number of items, the possessed amount of enhancement points, and the possessed amount of in-game currency are stored in the item list in the player management database 51.

The items in this embodiment are used, for example, to support training of characters or to change a running condition in a race, and can be obtained in accordance with the result of a race or obtained by consuming the in-game currency.

Furthermore, the enhancement points are used, for example, to enhance a support item that is an item for supporting training of a character. As the support item is enhanced, the character can be trained in a more advantageous training environment.

Furthermore, the player management database 51 stores, for each player, the history of achievement of missions related to special transfer. For example, a mission ID and whether a reward has been obtained or not are managed in linkage with the player ID.

Furthermore, the server data storage unit 50 includes a mission database 52, and the mission database 52 stores data related to recruitment conditions and rewards used in the special-transfer game function. In this embodiment, for example, the level of difficulty, a limited number of times, recruitment requirements, recruitment conditions, and a reward corresponding to an ability rank are stored in linkage with the mission ID.

The server game processing unit 60 performs processing for managing players, characters, etc. by using various kinds of identification information, such as player IDs, character individual IDs, character type IDs, etc., and processing for calculating a game result in response to a request(s) from the player terminal(s) 40, and is realized mainly by the control unit 21 and the communication unit 23. Furthermore, the server game processing unit 60 also performs processing for setting missions, processing for setting the content of rewards for individual characters, and processing for giving a reward for transfer of a character, and includes a mission setting unit 61 (one example of a specific-condition setting unit), a reward-content setting unit 62, and a reward giving unit 63.

The mission setting unit 61 performs processing for setting missions related to special transfer. In this embodiment, there are four levels of difficulty, from 1 star to 4 stars, related to missions, and the mission setting unit 61 sets four types of missions in total from the plurality of types of missions registered in the mission database 52, i.e., one mission from each level of difficulty. Furthermore, in this embodiment, the special-transfer game mode can be executed for a limited period of time of seven days, and the mission setting unit 61 performs processing for updating the missions every 24 hours.

The reward-content setting unit 62 performs processing for setting the content of rewards that can be obtained when trained characters possessed by the player are transferred in the special-transfer game mode. In this embodiment, the reward-content setting unit 62 refers to the statuses of trained characters registered in the character list in the player management database 51, extracts, from trained characters linked with the player ID, characters that satisfy the recruitment conditions for individual missions, and sets the content of rewards based on the statuses of the characters, in linkage with the mission IDs and the character individual IDs.

On the basis of the fact that an input for deciding transfer of a trained character that satisfies the recruitment conditions for a mission is performed at the player terminal 40, the reward giving unit 63 performs processing for giving a reward for the transfer-target character.

This embodiment has specifications in which cool time occurs from when an input for deciding transfer of a character that satisfies the recruitment conditions for a mission is performed at the player terminal 40 to when a reward can be received. Then, the reward giving unit 63 also performs processing for managing the cool time from when transfer of a trained character that satisfies the recruitment conditions is decided to when a reward is given. During the occurrence of the cool time, control is performed such that transfer of a character related to a new mission cannot be performed in the player terminal 40.

In this embodiment, the cool time is set to 5 minutes, for example. When a transfer request for requesting transfer of a character related to a mission is received from the player terminal 40, the reward giving unit 63 starts to manage the cool time in linkage with the player ID. Then, every time a notification that the special-transfer game mode has been selected is received from the player terminal 40, the reward giving unit 63 determines whether the cool time has expired. In the case where the cool time has expired, the reward giving unit 63 deletes a transfer-target character from the character list in the player management database 51, adds an item or the like corresponding to a reward to the item list in the player management database 51, and notifies the end of the cool time, the deletion of the character, and the giving of the reward, to the player terminal 40. When the end of the cool time, the deletion of the character, and the giving of the reward are notified from the server 20, a transfer completion dialog box indicating that the mission related to special transfer has been achieved is displayed at the player terminal 40.

Next, at the player terminal 40, as shown in FIG. 3, a terminal data storage unit 70 and a terminal game processing unit 80 collaborate to realize a function of providing an input interface for accepting an input for specifying, as a transfer target, a character possessed by the player.

The terminal data storage unit 70 stores data used when the terminal game processing unit 80 performs various kinds of processing, and is mainly realized by the storage unit 42.

Furthermore, the terminal data storage unit 70 includes a player-data storage unit 71, and the player-data storage unit 71 stores data related to the character list and the item list, which are linked with the player ID. In this embodiment, at the time of activation of an application, the player terminal 40 obtains the character list and the item list from the server 20, temporarily stores the character list and the item list in the player-data storage unit 71, and executes various kinds of game processing. In this embodiment, in the case where the character list and the item list need to be changed through execution of various kinds of game processing, the player management database 51 is updated, and the player-data storage unit 71 is also updated, whereby the memory content of both are synchronized. Note that it is also possible that the character list and the item list are held as local data at the player terminal 40, and the player-data storage unit 71 and the player management database 51 are synchronized as needed.

Furthermore, the terminal data storage unit 70 includes a mission-data storage unit 72, and the mission-data storage unit 72 stores mission data that is data obtained from the server 20 and required for special-transfer game progression, the mission data including, for example, information about mission IDs, recruitment requirements, recruitment conditions, characters that can be transferred (transferable characters) among the characters registered in the character list, and rewards that can be obtained when the transferable characters are transferred. In this embodiment, for convenience of description, a character that satisfies the recruitment conditions for a mission and that is not set in the locked state, thus being transferable, is referred to as a transferable character, in some cases.

The terminal game processing unit 80 performs processing for starting a game in the case where a game start condition is satisfied, processing for executing a game mode selected from among a plurality of types of game modes, processing for proceeding with the game, processing for making an event occur in the case where an event occurrence condition is satisfied, processing for calculating a game result, processing for requesting the server 20 to calculate a game result, processing for obtaining the game result calculated at the server 20, and processing for ending the game in the case where a game end condition is satisfied. The terminal game processing unit 80 is mainly realized by the control unit 41 and the communication unit 45. Furthermore, the terminal game processing unit 80 includes an input accepting unit 81 that provides an input interface for accepting various kinds of inputs required to proceed with the game.

The input accepting unit 81 performs processing for making the display unit 44 display a display screen in accordance with the game mode and the progression of the game, to provide an input interface for accepting a player input through the display screen.

The input accepting unit 81 sends a mission acquisition request to the server 20 in the case where the special-transfer game mode is selected, and obtains, from the server 20, mission data including information (recruitment requirements, recruitment conditions, transferable characters, and rewards to be given when the characters are transferred) linked with the mission IDs related to special-transfer missions set at that moment. Then, the input accepting unit 81 performs processing for making the display unit 44 display, on the basis of the mission data, a mission selection screen that serves as an input interface for accepting an input for selecting a mission.

Furthermore, when a mission is selected in the mission selection screen, the input accepting unit 81 performs processing for making the display unit 44 display, on the basis of the selected mission ID, a character selection screen (one example of a consumption-target specification screen) that serves as an input interface for accepting an input for specifying, as a transfer target, a trained character possessed by the player.

Furthermore, the input accepting unit 81 displays the content of a reward for a character specified as a transfer target, on the character selection screen on the basis of information related to the transferable characters linked with the mission IDs in the mission data. In this embodiment, the content of rewards for trained characters possessed by the player is set at the reward-content setting unit 62 of the server 20, and information including the content of the rewards is stored in the mission-data storage unit 72 in linkage with the mission IDs. Then, the input accepting unit 81 displays a list of trained characters possessed by the player (a list of characters registered in the character list) on the character selection screen, refers to, in the case where a character that satisfies the recruitment conditions for a mission is specified, the content of the reward, for this character, stored in the mission-data storage unit 72, and displays an icon image, a text, etc. indicating the content of the reward on the character selection screen.

Furthermore, the input accepting unit 81 performs processing for making the display unit 44 display a transfer confirmation dialog box that serves as an input interface for accepting an input for deciding transfer of a character in special transfer. In this embodiment, the processing for displaying the transfer confirmation dialog box is performed via a character details screen in which the detailed statuses of the character specified as a transfer target on the character selection screen can be confirmed. Then, when an input for deciding transfer of the character is performed on the transfer confirmation dialog box, the input accepting unit 81 performs processing for sending a transfer request to the server 20. In this embodiment, as described earlier, when the server 20 receives a transfer request, the reward giving unit 63 performs processing related to giving of the reward. Then, after the reward is given by the reward giving unit 63, the input accepting unit 61 performs processing for making the display unit 44 display a transfer completion dialog box, to notify the player that the reward has been given.

2. Control Method of this Embodiment

A control method of this embodiment will be described below by using an example case in which a game program of this embodiment is applied to a game application for the player terminal 40, which is provided as a smartphone.

The game program of this embodiment is configured so as to be able to provide a plurality of types of game functions. In the training function, which is a main game function (one example of another game mode), a training-target character is selected from among a plurality of types of characters, and the statuses of the character change in accordance with the progression of the game and are determined when a predetermined completion condition is satisfied, whereby training thereof is completed. This trained character can be made to play a race against a character trained by another player, in a race function that is another game function. Furthermore, in this embodiment, a possession quota for trained characters (the number of trained characters that can be registered in the character list) is defined in advance, and, when the number of trained characters reaches the upper limit (for example, 200 characters) of the possession quota, it becomes impossible to train a new character in the training function. Thus, it is necessary to delete a trained character from the character list to secure the possession quota. Then, in the information processing system 10, to which the game program of this embodiment has been applied, the special-transfer function can be executed as a game function opened for a limited period of time.

In the special-transfer function, which is provided by the game program of this embodiment, a trained character that satisfies the recruitment conditions set for a mission is consumed in the form of transfer, whereby it is possible to get a reward corresponding to the statuses of the transfer-target character.

Before the special-transfer function is described, the training function of training a character that can be a transfer target will be described briefly.

With the training function, the player arbitrarily selects one training-target character from among a plurality of types of characters and performs training of the training-target character. The initial statuses of the plurality of types of characters that can be selected as training targets are set for the individual characters. Furthermore, training-target characters have acquired skills (unique skills) unique to the types of the characters from the beginning of training, and the effects obtained when the unique skills are exercised are different from each other. Furthermore, for the plurality of types of characters that can be selected as training targets, growth correction factors of parameters of the speed, the stamina, the power, the guts, and the cleverness are set depending on the characters, and parameters that can easily increase are set for the individual types of characters.

When a training target is selected, and training of the character is started, for example, the character can be trained by making an instruction for training in each of 72 turns in total. Specifically, when an instruction for training associated with the parameters of the speed, the stamina, the power, the guts, and the cleverness is made, changes in the parameters and acquisition of skill points occur in accordance with the training result. Furthermore, by making an instruction for running in a race, one turn can be consumed, and changes in the parameters and acquisition of skill points can be brought about in accordance with the race result. Furthermore, when the event occurrence condition is satisfied during the training, an event occurs, thus causing an increase in the type of an acquirable skill and changes in the parameters. The above-mentioned skill points are used to make the training-target character acquire skills, and it is possible to make the training-target character acquire a skill from a list of acquirable skills by consuming the possessed skill points.

Then, when 72 turns are consumed, a training completion condition is satisfied, the statuses of the character are determined, and the training-completed character is registered in the character list. Note that, in the training function of this embodiment, a training goal for a training-target character is set, and, for example, in the case where the training goal has not been achieved when a fixed number of turns has elapsed, the training completion condition is satisfied when the training goal has not been achieved even though 72 turns have not been consumed, and thus the statuses of the character are determined, in some cases. Furthermore, when the statuses are determined, a title(s) is given in accordance with a race record of the trained character. Giving conditions are set for individual titles, and titles for which the giving conditions are satisfied when the statuses are determined are all given. Thus, a plurality of types of titles are given to one trained character, in some cases.

Next, the special-transfer function in the game program of this embodiment will be described below.

First, for the special-transfer function, missions are regularly updated at the server 20. FIGS. 4 and 5 show examples of mission setting content in a situation in which the special-transfer function is open. In this embodiment, the special-transfer function is open only for seven days, and the server 20 updates the mission setting content once a day at a predetermined update time (for example, 12:00). For example, if missions on the first day are as shown in FIG. 4, the missions are updated at 12:00 on the next day to missions on the second day, as shown in FIG. 5. The mission setting content is updated at the predetermined update time similarly on the third day, and thereafter, the mission setting content is updated six times in total in this embodiment.

Furthermore, in this embodiment, as shown in FIGS. 4 and 5, in the mission setting content on each day, missions are each selected from each of the levels of difficulty from 1 star to 4 stars. Furthermore, the missions include: a mission for which the recruitment conditions are set in association with the distance aptitude, a parameter, and a possessed skill of a character; and a mission for which the recruitment conditions are set in association with a race record during training of a character. For example, a mission with a mission ID “34001” shown in FIG. 4 is a mission for which the recruitment conditions include the distance aptitude, a parameter, and a skill, and a mission with a mission ID “54001” shown in FIG. 5 is a mission for which the recruitment conditions include a race record. Note that the number of set missions may be different each day, and the distribution of the levels of difficulty is not necessarily even.

Figure 6:
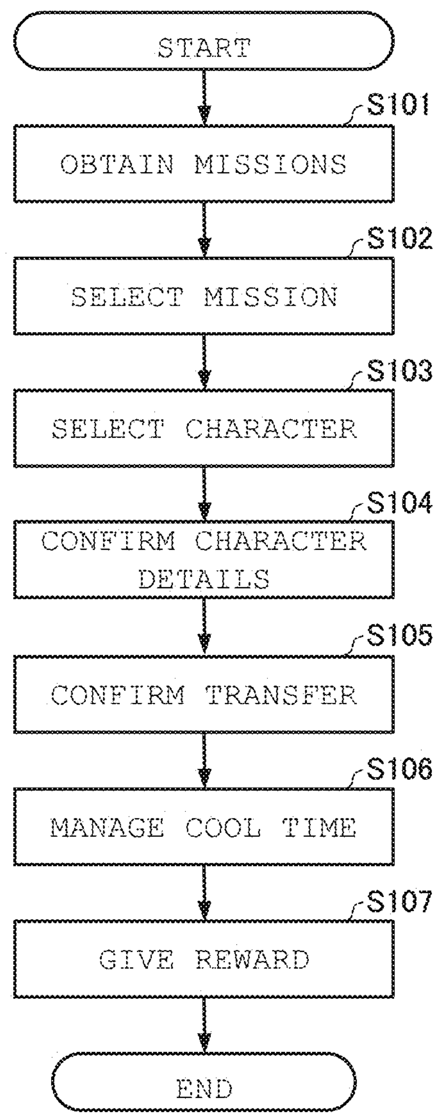
FIG. 6 is a view showing the outline of game progression related to the game function of consuming a character to get a reward.

FIG. 6 is a view showing the outline of game progression related to the special-transfer function.

First, when the special-transfer game mode is selected at the player terminal 40, the player terminal 40 obtains, from the server 20, data (mission data) related to the mission setting content and the reward content to be given when a character registered in the character list is transferred (Step S101).

Specifically, on the basis of the fact that an input for selecting the special-transfer game mode is performed, the player terminal 40 sends a mission acquisition request to the server 20. Upon reception of the mission acquisition request, the server 20 first refers to the player management database 51 and extracts characters that satisfy the recruitment conditions for missions set at the current time (the time at which the mission acquisition request is received), from the character list linked with the player ID of the transmission source of the mission acquisition request. The characters are extracted for each mission ID, the statuses of characters registered in the character list are referred to, and whether each of the characters satisfies the recruitment conditions linked with the mission ID is determined. Note that extraction of characters and setting of rewards for the characters are not performed during the occurrence of the cool time to be described later.

For example, for a mission with a mission ID “22003” shown in FIG. 4, it is determined whether the distance aptitude and the speed of each character satisfy the recruitment conditions.

In this embodiment, there are four types, i.e., the short distance, the mile, the middle distance, and the long distance, provided as categories for the distance aptitude, and the aptitude of every character in each of the categories is classified into any of eight ranks of S, A, B, C, D, E, F, and G. The ranks of the aptitudes are in the order S>A>B>C>D>E>F>G, and a race simulation is performed in which the ability is more easily demonstrated in a race as the aptitude becomes higher. Regarding the distance aptitude, although the aptitude in each of the categories is initially set for each type of training-target character, the rank of the aptitude may change due to a game event etc. during training.

Then, in the mission ID “22003” shown in FIG. 4, since one of the recruitment conditions is that the distance aptitude in the category of the mile is “A” or higher, a character of which the aptitude for the mile is “S” or “A” satisfies this condition.

Furthermore, in this embodiment, the individual parameters of the speed, the stamina, the power, the guts, and the cleverness change due to a training result etc. during training of a character, the values of the parameters are determined within the range from 0 to 1200 when the training is completed, and the parameters are individually classified into any of 14 ranks of SS+, SS, S+, S, A+, A, B+, B, C+, C, D, E, F, and G according to the values thereof. The values of the parameters are in the order of SS+>SS>S+>S>A+>A>B+>B>C+>C>D>E>F>G, and the running speed, the acceleration, the endurance, etc. are calculated in a race simulation on the basis of these parameters.

Then, in the mission ID “22003” shown in FIG. 4, since the other one of the recruitment conditions is that the speed is “B” or higher, a character the speed of which is any of the ranks from “SS+” to “B” satisfies this condition.

Then, in this embodiment, a character that is determined to satisfy all of the recruitment conditions for each mission is extracted, and the content of a reward(s) to be given in the case where the extracted character is transferred is decided.

Here, in this embodiment, when a reward for a character that satisfies the recruitment conditions for a mission is decided, the evaluation points of the character are referred to. When training of a character is completed in the training function, scores of the parameters of the speed, the stamina, the power, the guts, and the cleverness and scores of a possessed skill(s) are calculated according to predetermined criteria, and the sum of these scores is treated as evaluation points to be used to determine the rank of the character. In this embodiment, 14 ranks of SS+, SS, S+, S, A+, A, B+, B, C+, C, D, E, F, and G are provided according to the value of the evaluation points, and the evaluation points are high in the order of SS+>SS>S+>S>A+>A>B+>B>C+>C>D>E>F>G.

Then, in this embodiment, the number of ranks set for a reward(s) linked with each mission ID is one or two or more. In the case where one rank is set for a reward, the evaluation points, which serve as a criterion for deciding a reward, are set to 0 (corresponding to rank G), and a reward is associated with a character that satisfies the recruitment conditions irrespective of the value of the evaluation points of the character. In the example shown in FIG. 4, missions with the mission IDs “34001” and “13002” correspond to the case where one rank is set for a reward. Furthermore, in the case where two or more ranks are set for rewards, criteria of the evaluation points are set in accordance with the ranks, and the reward content that corresponds to the highest criterion that the evaluation points of a character clear is associated. In the example shown in FIG. 4, missions with the mission IDs “22003” and “41006” correspond to the case where two or more ranks (three ranks) are set for rewards. For example, in the case where the reward content related to the mission ID “22003” is associated, if the evaluation points of a character A extracted as a character satisfying the recruitment conditions are “5000”, the enhancement points×5000 and the in-game currency×10000 are associated as the reward content to be given when the character A related to the mission ID “22003” is transferred. Note that, instead of referring to the evaluation points as in this embodiment, it is also possible to associate the reward content by referring to arbitrary information related to the statuses of a character managed in the character list, the statuses including the rank based on the evaluation points, the parameters of the speed etc., the possessed skill(s), the title(s), various types of aptitude such as the distance aptitude, etc.

After extraction of characters satisfying the recruitment conditions and association of the reward content for the extracted characters are completed as described above, the server 20 sends, to the player terminal 40, mission data including the mission setting content and the result of association of the reward content with the character list.

When acquisition of the mission data from the server 20 is completed, the player terminal 40 displays the mission selection screen and accepts an input for selecting a mission for the special transfer (Step S102).

Figure 7:
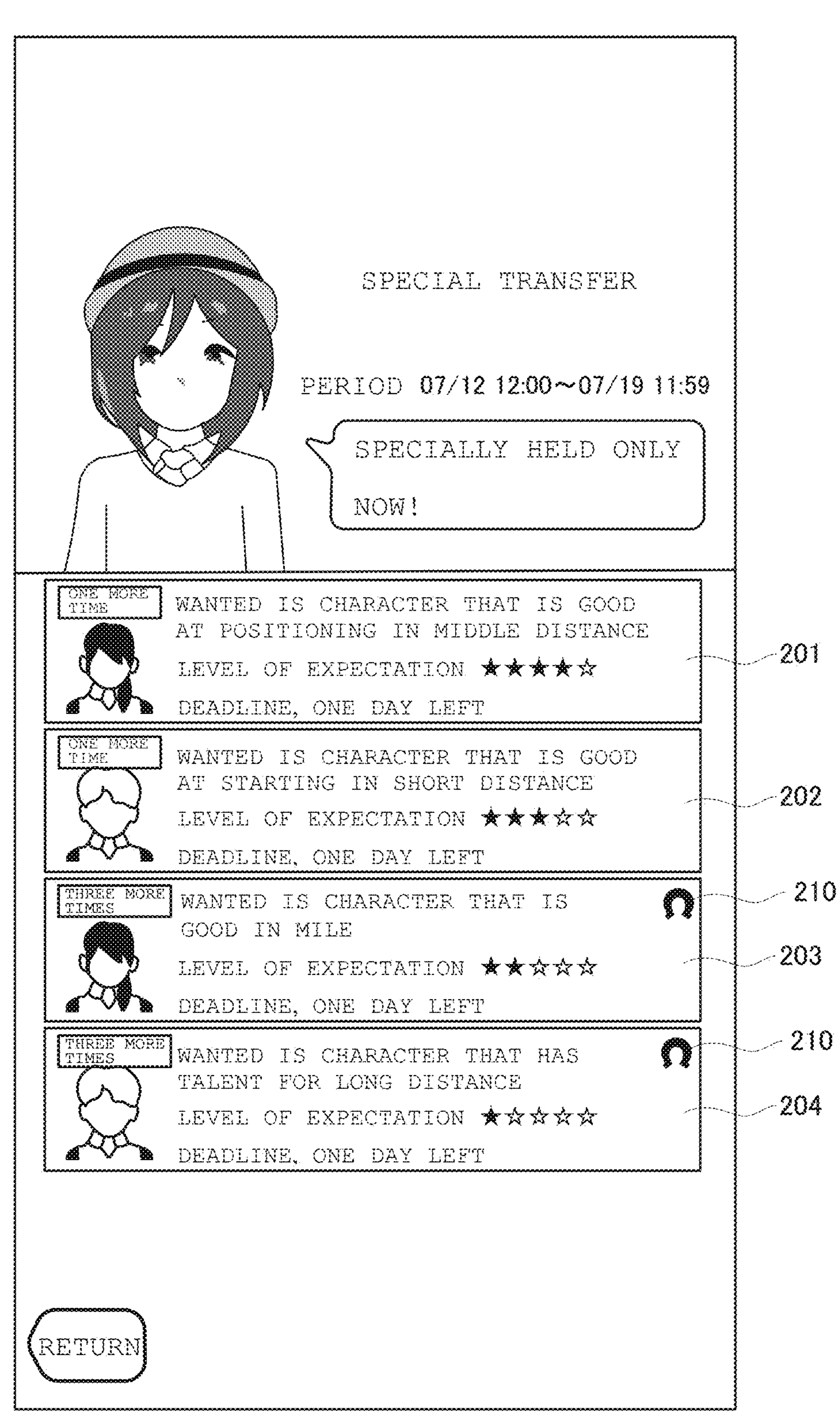
FIG. 7 is a view showing one example of a mission selection screen displayed at the player terminal.

FIG. 7 is a view showing one example of the mission selection screen displayed at the player terminal 40.

Mission banners 201 to 204 corresponding to four types of missions based on the mission data obtained from the server 20 are provided on the mission selection screen. In each of the mission banners, the recruitment requirements linked with the mission ID are displayed, whereby the outline of the mission can be known. Furthermore, the number of times the mission can be executed, the level of expectation corresponding to the level of difficulty of the mission, and the acceptance deadline of the mission are also displayed in each of the mission banners. Note that, in this embodiment, although a description is given of an example case in which only missions of which the acceptance deadline is one day left are set, it is also possible to include a mission(s) of which the acceptance deadline is two days or longer left.

Furthermore, in the mission selection screen, a badge icon 210 is displayed with respect to a mission for which there exists a character(s), in the character list, that satisfies the recruitment conditions. Whether there exists a character(s) that satisfies the recruitment conditions can be determined, for example, depending on whether a badge-icon flag is set, the badge-icon flag being set in linkage with the mission ID of a mission for which there exists a transferable character(s) in the mission data obtained from the server 20. Furthermore, whether there exists a character(s) that satisfies the recruitment conditions may also be determined at the player terminal 40, for example, by referring to the character list in the player-data storage unit 71 and determining whether any of the characters satisfies the recruitment conditions. Furthermore, even for a mission for which there exists a character(s) that satisfies the recruitment conditions, if such a character(s) that satisfies the recruitment conditions is set in the locked state, the badge icon 210 is not displayed. In the example shown in FIG. 7, since the badge icon 210 is displayed with respect to the mission banners 202 and 204, it is possible to instantly grasp that missions corresponding to these mission banners can be achieved. Note that a mission banner corresponding to a mission for which there exist no characters that satisfy the recruitment conditions may be grayed out.

Furthermore, in this embodiment, although mission banners are displayed on the mission selection screen in the order of the level of difficulty of the missions, mission banners on the mission selection screen may be displayed such that the mission banner of a mission for which there exists a character(s) that satisfies the recruitment conditions and that is transferable (mission banner in which the badge icon 210 is displayed) is displayed at a higher position. Furthermore, it is also possible to set the display order of mission banners on the basis of the acceptance deadline or the number of executable times of missions. Furthermore, a mission of which the number of executable times is 0 may be displayed at a lower position than a mission of which the number of executable times is 1 or more. Furthermore, a mission of which the number of executable times is 0 may be displayed with a distinguishable stamp or may be grayed out.

Then, when a tap input is performed on any of the mission banners 201 to 204 in the mission selection screen, the display screen is transitioned from the mission selection screen to the character selection screen, and an input for selecting a character from the character list and specifying the character as a transfer target related to the special transfer is accepted (Step S103).

Figure 8:
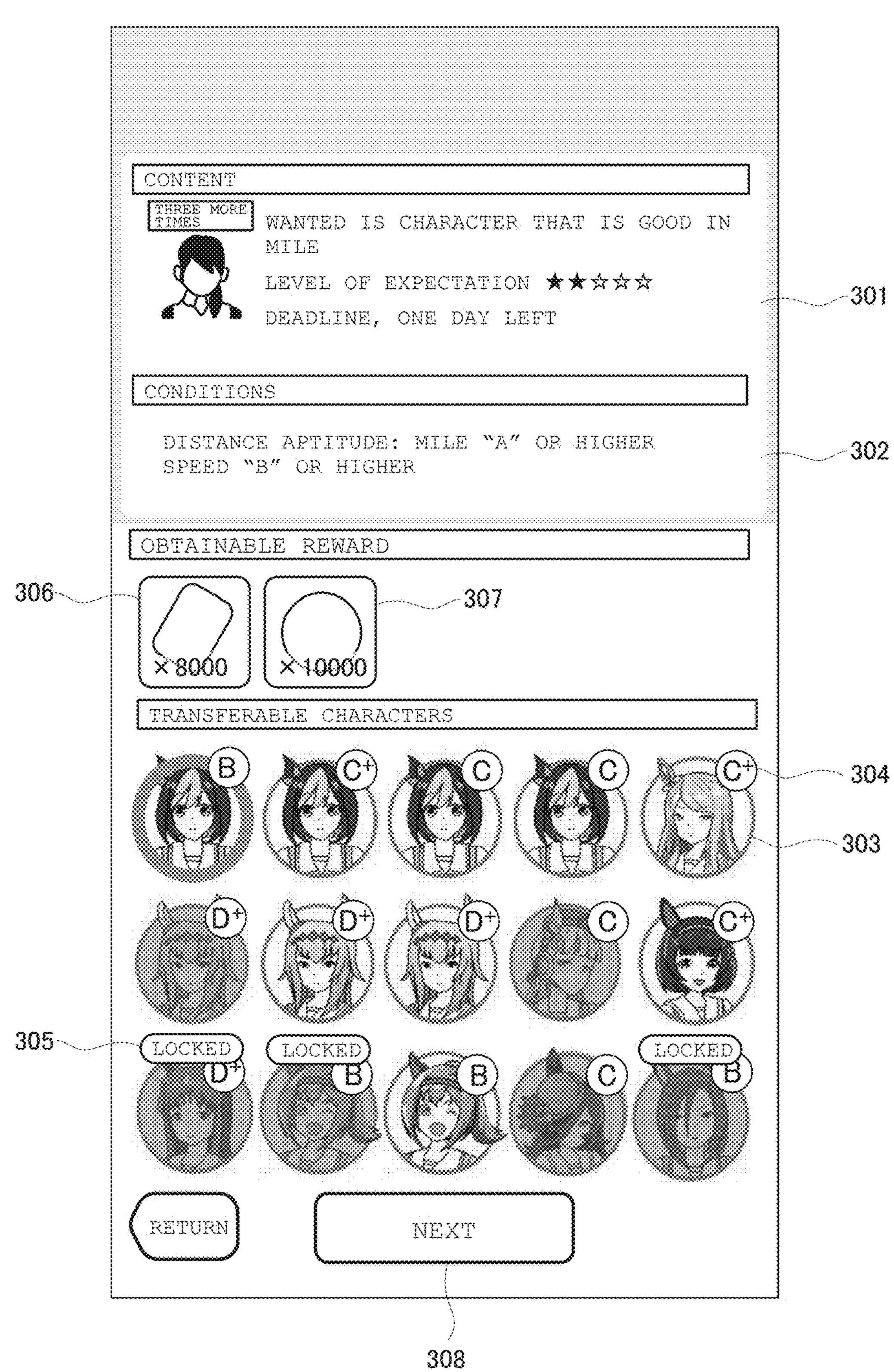
FIG. 8 is a view showing one example of a character selection screen displayed at the player terminal.
Figure 9:
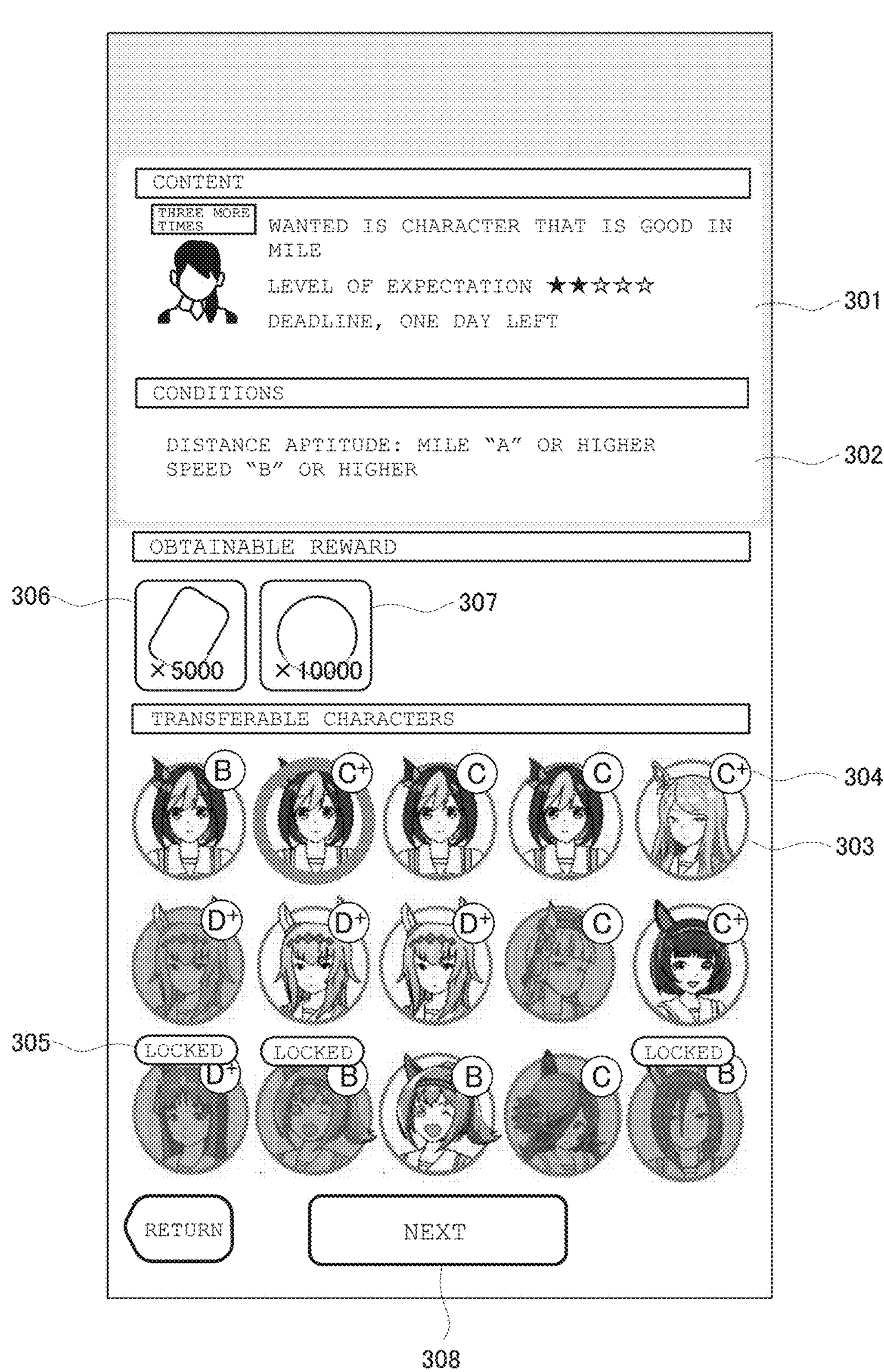
FIG. 9 is a view showing one example of the character selection screen displayed at the player terminal.
Figure 10:
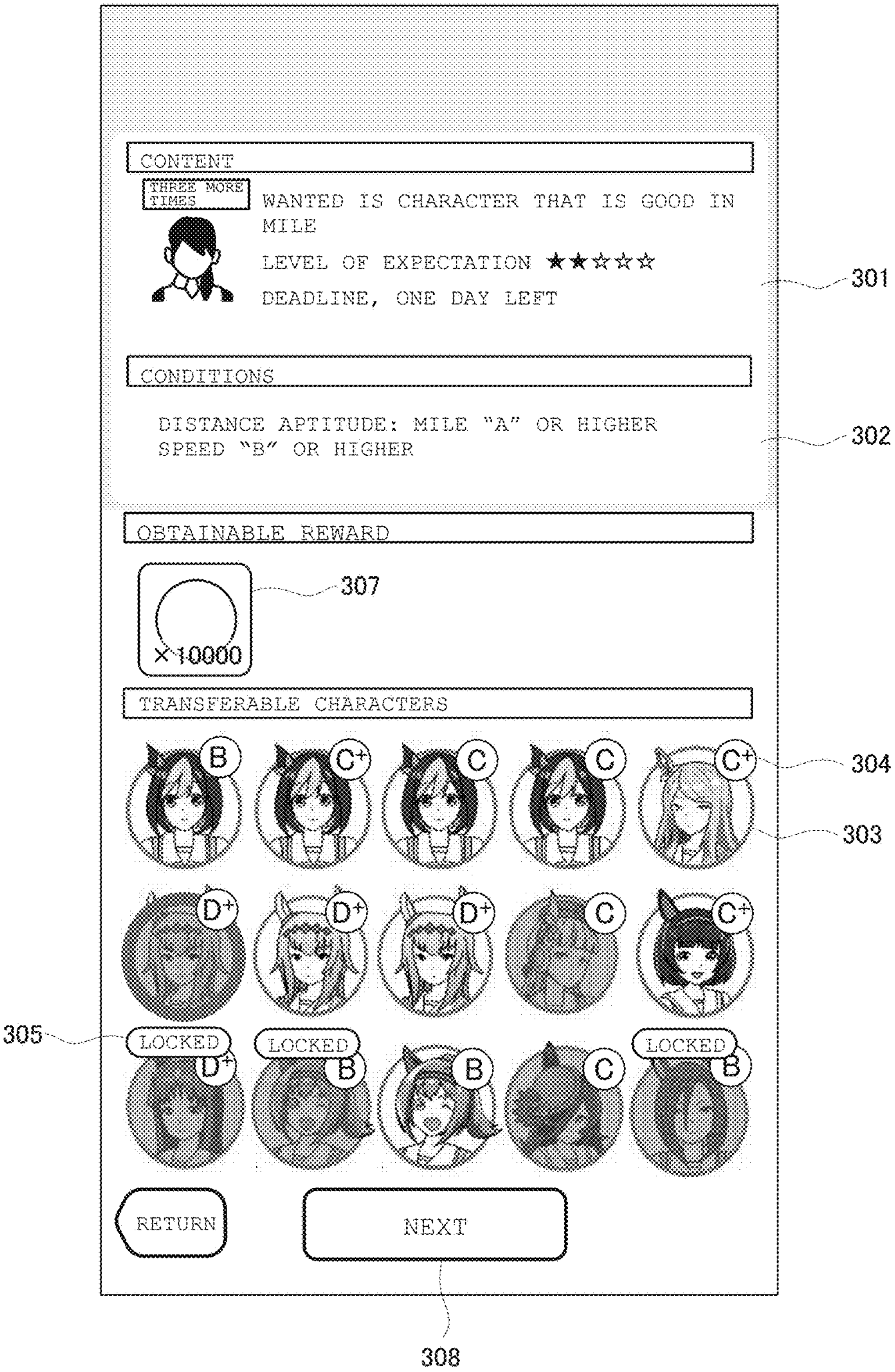
FIG. 10 is a view showing one example of the character selection screen displayed at the player terminal.

FIGS. 8 to 10 are views showing examples of the character selection screen displayed at the player terminal 40.

The character selection screen includes a recruitment-requirement field 301 where the recruitment requirements for the mission banner are displayed and a recruitment-condition field 302 where the recruitment conditions for the mission are displayed, whereby it is possible to confirm the details of conditions that should be satisfied by a character in order to get a reward(s).

Furthermore, in the character selection screen, a list of trained characters registered in the character list and possessed by the player is displayed, and a character icon corresponding to the character type ID and a rank badge attached to the character icon are displayed for each of the characters. This rank badge indicates the rank of the character, the rank being given in accordance with the evaluation points when the training of the character is completed, and the ability of the character can be confirmed on the basis of the display content of the rank badge. Although the rank of the character indicated by the rank badge shows the result of comprehensive evaluation of the statuses of the character, and the individual parameters, such as the speed, cannot be grasped, the parameters can be confirmed in the character details screen, to be described later.

Furthermore, in the character selection screen, character icons of characters that are determined not to satisfy the recruitment conditions for the selected mission are grayed out, and character icons of characters that are set in the locked state due to, for example, the case of running in a race are grayed out with locked badges 305 being attached thereto, since those characters that are set in the locked state are not extracted at the server 20 at the time of association of rewards. Note that it is also possible that, of the characters registered in the character list, character icons of only characters that satisfy the recruitment conditions for the selected mission are displayed in the character selection screen.

Furthermore, in the character selection screen, when a tap input is performed on an arbitrary character icon, the character icon is set in a specified state, and the character icon set in the specified state is displayed with the outline thereof emphasized. Then, in the character selection screen, the content of a reward(s) that can be obtained in the case where the character corresponding to the character icon set in the specified state becomes a transfer target is displayed. In the example shown in FIG. 8, it is found that rewards of the enhancement points×8000 and the in-game currency×10000 can be obtained, with an icon 306 for the enhancement points and an icon 307 for the in-game currency. Note that the content of a reward(s) may be displayed by text display, instead of icon display.

Furthermore, in the character selection screen, when a character icon that is set in the specified state is changed, as shown in FIG. 9, the content of a reward(s) that can be obtained in the case where the character corresponding to the character icon that is newly set in the specified state becomes a transfer target is displayed. In the example shown in FIG. 9, it is found that rewards of the enhancement points×5000 and the in-game currency×10000 can be obtained, with the icon 306 for the enhancement points and the icon 307 for the in-game currency.

Furthermore, in the character selection screen, in the case where a grayed-out character icon is set in the specified state, the content of a reward that serves as the minimum guarantee for the selected mission is displayed, as shown in FIG. 10. In an example case of a mission of which the level of difficulty is 2 stars, shown in FIG. 10, a reward (in-game currency×10000) serving as the minimum guarantee is assigned when the rank of the character is less than the evaluation points 4900 (corresponding to rank C+), and the icon 307 for the content of the reward is displayed. By doing so, the content of the minimum guarantee of the reward for the selected mission can be easily grasped. Note that it is also possible that, even when a grayed-out character icon is set in the specified state, an icon for the content of the reward is not displayed. Furthermore, control may also be performed such that, even when a tap input is performed on a grayed-out character icon, the tap input is treated as an invalid input, and the grayed-out character icon is not set in the specified state.

Then, in the character selection screen, when a tap input is performed on a details confirmation button 308 provided at a lower section of the screen, with the character icon of a character that satisfies the recruitment conditions for the selected mission being set in the specified state, the display screen is transitioned from the character selection screen to the character details screen, and an input for deciding consumption of the character specified as a transfer target for special transfer is accepted (Step S103). Note that, in the character selection screen, with the character icon of a character that does not satisfy the recruitment conditions for the selected mission being set in the specified state, a tap input performed on the details confirmation button 308 is treated as an invalid input, whereby the display screen is not transitioned to the character details screen. Furthermore, in the character selection screen, with the character icon of a character that does not satisfy the recruitment conditions for the selected mission being set in the specified state, the details confirmation button 308 may be grayed out so as to indicate that the details confirmation button 308 is deactivated.

Figure 11:
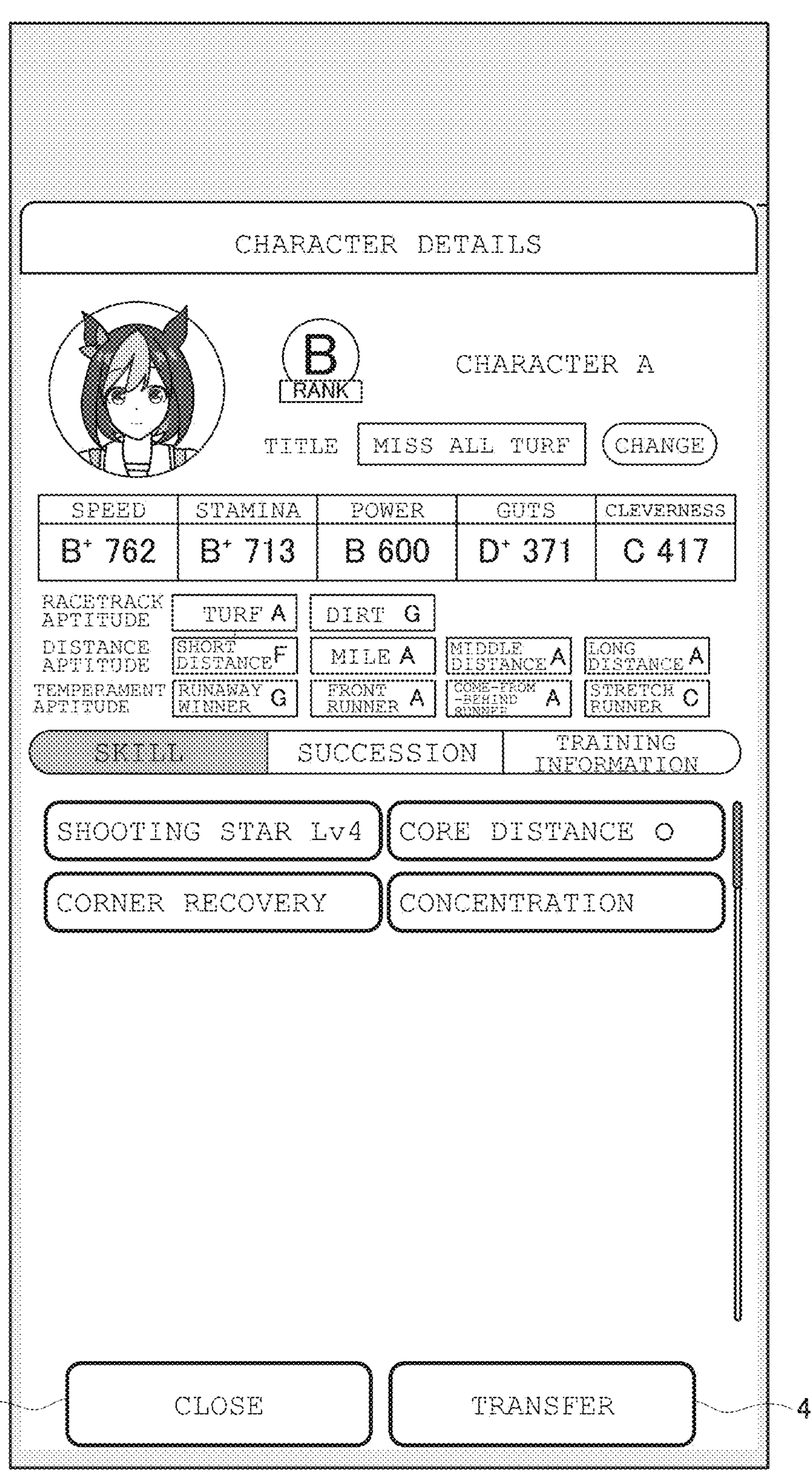
FIG. 11 is a view showing one example of a character details screen displayed at the player terminal.

FIG. 11 is a view showing one example of the character details screen.

In the character details screen, the details of the statuses of the character that is set in the specified state when the display screen is transitioned from the character selection screen are displayed. The statuses of the character are displayed on the basis of data registered in the character list. For example, the various parameters of the title, the speed, the stamina, the power, the guts, and the cleverness, the course aptitude, the distance aptitude, the racing-style aptitude, and the skills can be confirmed in the character details screen.

Furthermore, a transfer confirmation button 401 is provided at a lower section of the character details screen, and, when a tap input is performed on the transfer confirmation button 401, the transfer confirmation dialog box is displayed in the foreground to accept an input for deciding transfer of the character (Step S105). Furthermore, a screen return button 402 is also provided in the character details screen, and, when a tap input is performed on the screen return button 402, the display screen is returned to the character selection screen.

Figure 12:
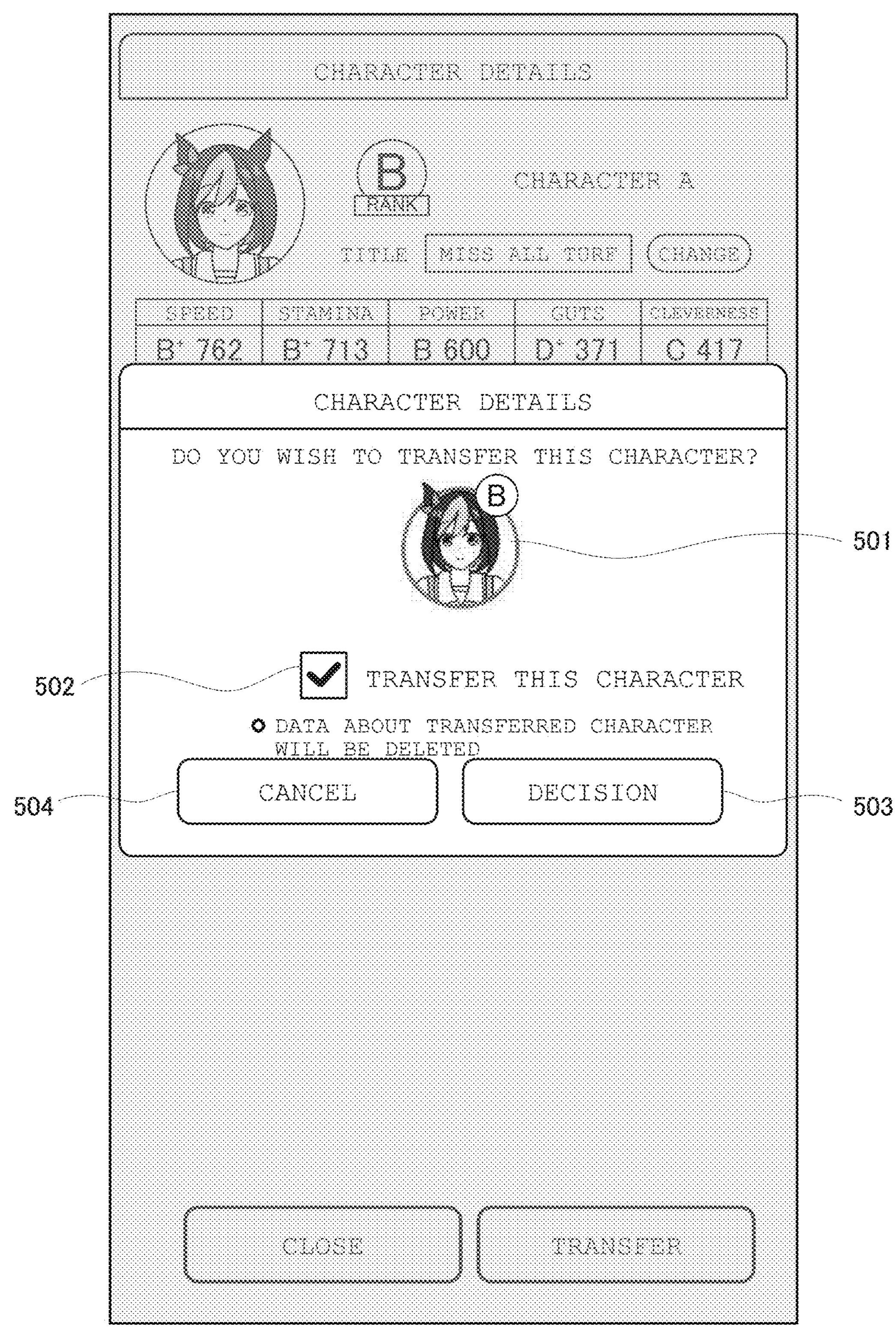
FIG. 12 is a view showing one example of a transfer confirmation dialog box displayed at the player terminal.

FIG. 12 is a view showing a display example of the transfer confirmation dialog box.

The transfer confirmation dialog box includes the character icon of the character specified as a transfer target, a checkbox 502 for confirming transfer of the character, a decision button 503 for deciding the transfer of the character, and a cancel button 504 for cancelling the transfer of the character.

In the transfer confirmation dialog box, the presence or absence of a checkmark can be switched when a tap input is performed on the checkbox 502, and the transfer of the character is determined when a tap input is performed on the decision button 503 with a checkmark being displayed in the checkbox 502. Note that control is performed such that the decision button 502 is grayed out with a checkmark not being displayed in the checkbox 502, and a tap input on the decision button 502 cannot be accepted. Furthermore, in the case where a tap input is performed on the cancel button 504 in the transfer confirmation dialog box, the display screen is returned to the character details screen.

Figure 13:
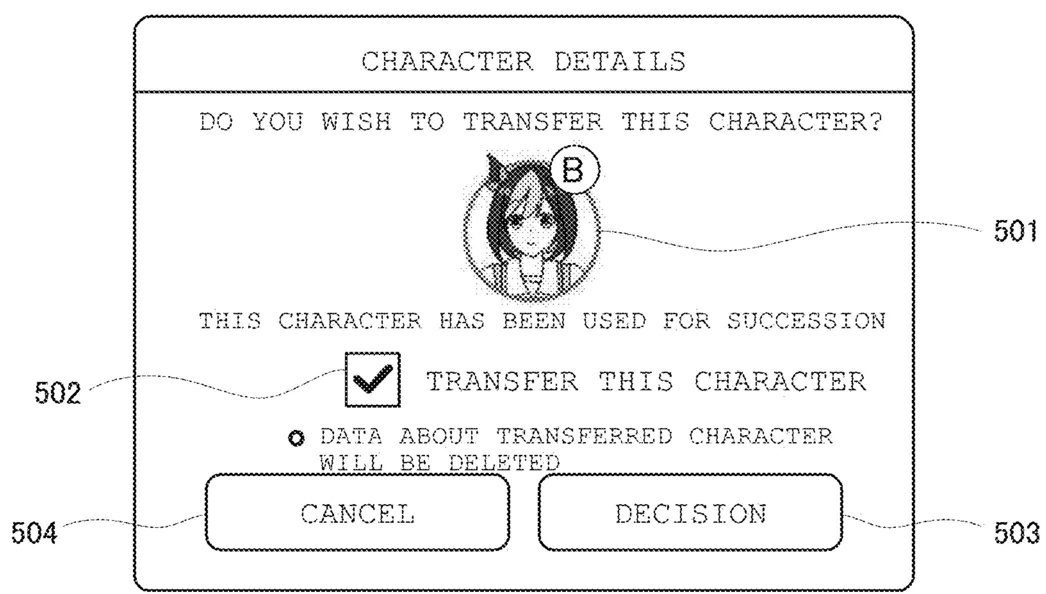
FIG. 13 is a view showing one example of the transfer confirmation dialog box displayed at the player terminal.

Furthermore, the game program of this embodiment has specifications in which the training function has succession. The succession means that a trained character registered in the character list is set as a support character when training of a character is started, and the training is advantageously proceeded on the basis of the statuses of the character. Then, with the special-transfer function, since a trained character is consumed in the form of transfer to get a reward, thereby deleting the transfer-target character from the character list, the transferred character will not be able to be used thereafter as a support character. Thus, in this embodiment, in the case where a character specified as a transfer target has been used as a support character, a message is displayed in the transfer confirmation dialog box to notify that the transfer-target character has been used for succession, as shown in FIG. 13. By doing so, it is possible to prevent a situation in which a character that is possibly used as a support character in the future is erroneously specified as a transfer target.

Figure 14:
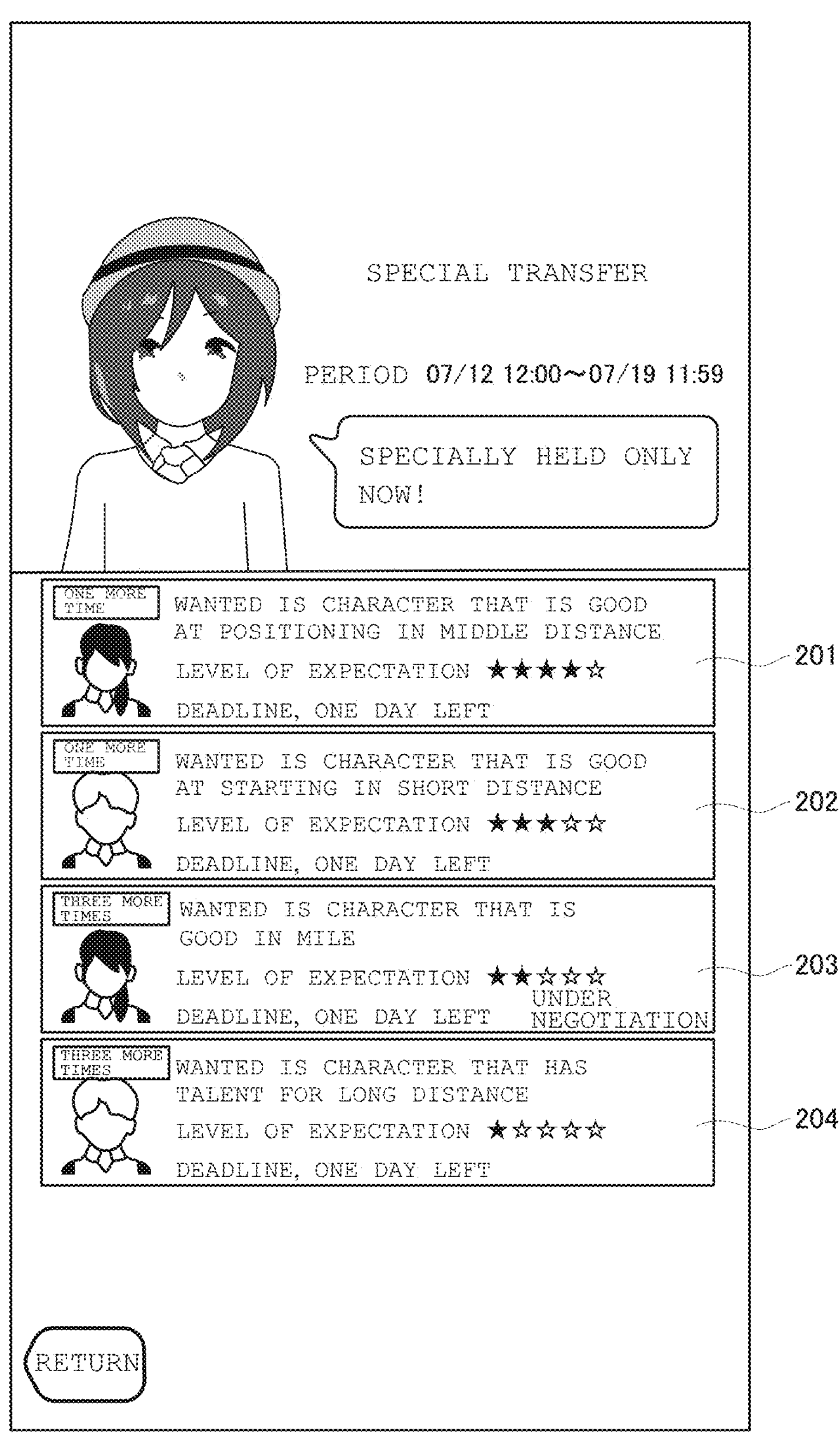
FIG. 14 is a view showing one example of the mission selection screen displayed at the player terminal.

Then, in the transfer confirmation dialog box, when a tap input is performed on the decision button 503 with a checkmark being displayed in the checkbox 502, the player terminal 40 sends a character transfer request to the server 20. Upon reception of the transfer request, the server 20 starts management of the cool time (Step S106). At the player terminal 40, the display screen is returned to the mission selection screen, and a message "under negotiation" is displayed in the mission banner corresponding to the mission for which the cool time is occurring, as shown in FIG. 14. Furthermore, during the occurrence of the cool time, even when there is a character that satisfies the recruitment conditions for another mission, a new mission related to the special-transfer function cannot be performed, and a badge icon is not displayed in the individual mission banners.

When the management of the cool time is started, the server 20 determines whether the cool time (for example, five minutes) has expired every time a mission acquisition request is received from the player terminal 40. Expiration of the cool time is determined, for example, by using the elapsed time since the character transfer request is received from the player terminal 40. Furthermore, when the mission acquisition request is received from the player terminal 40, if it is determined that the cool time is occurring at the server 20, extraction of characters that satisfy the recruitment conditions for missions from the character list and association of rewards are not performed. In this case, the server 20 responds to the mission acquisition request to send, to the player terminal 40, mission data in which character individual IDs are not linked with mission IDs.

Then, when the mission acquisition request is received from the player terminal 40, if it is determined that the cool time has expired in the server 20, a reward that is associated with the mission for which it is determined that the cool time has expired is given (Step S107). Note that, in the management of the cool time, it is possible that, when an input for deciding transfer of the character is performed in the transfer confirmation dialog box with the cool time being set to 0, the cool time is immediately determined to have expired in the server 20, and a reward is given. Furthermore, the length of the cool time can be arbitrarily set, and management of the cool time may not be performed.

In this embodiment, an item etc. corresponding to the reward associated with the consumption-target character is added to the item list in the player management database 51, the item list being linked with the player ID of the transmission source of the mission acquisition request, whereby the item list is updated. Furthermore, when the cool time has expired, the transfer-target character is deleted from the character list in the player management database 51, the character list being linked with the player ID of the transmission source of the mission acquisition request, as processing for transferring the character, whereby the character list is updated. After update of the item list and the character list is completed, the server 20 sends these pieces of updated data to the player terminal 40 together with the mission data in response to the mission acquisition request.

Figure 15:
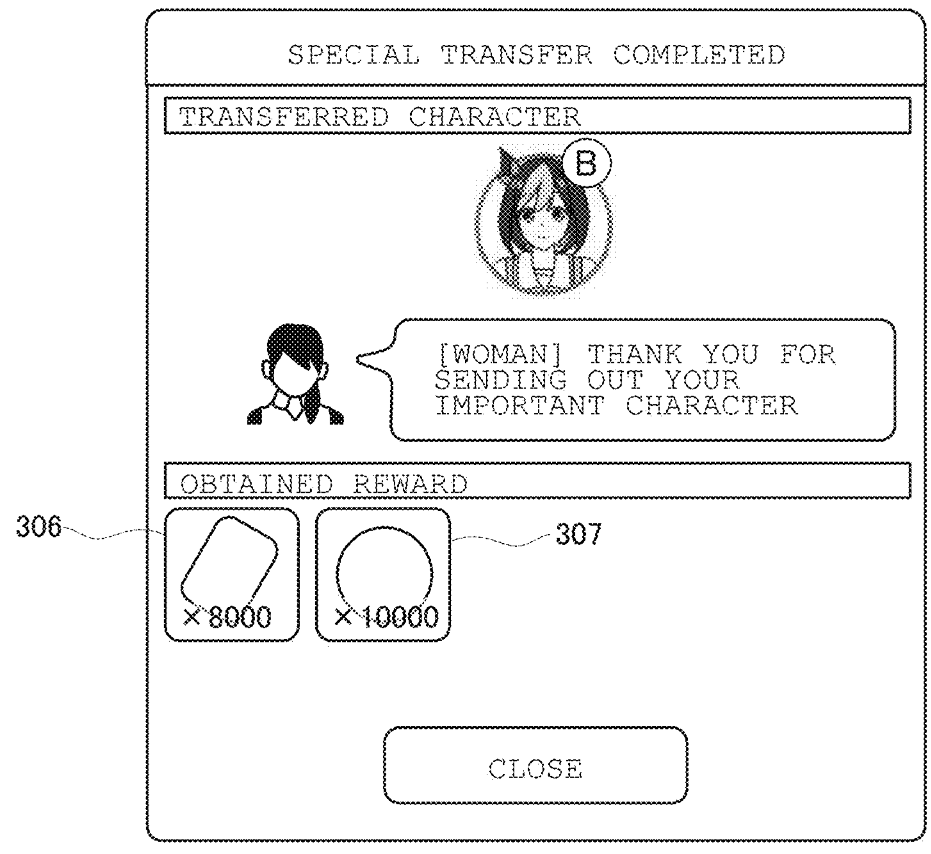
FIG. 15 is a view showing one example of a transfer completion dialog box displayed at the player terminal.

Then, when the updated data of the item list and the character list is received from the server 20 together with the mission data, the player terminal 40 updates the mission data stored in the mission-data storage unit 72 on the basis of the received mission data, updates the character list and the item list stored in the player-data storage unit 71 on the basis of the updated data of the character list and the item list, and displays the transfer completion dialog box shown in FIG. 15 in front of the mission selection screen to notify the player that the special-transfer mission has been completed and that the reward has been given.

In the above-described embodiment, regarding the special-transfer function of getting a reward by consuming, in the form of transfer, a trained character registered in the character list, since a reward can be obtained in the case where a character that satisfies the recruitment conditions set for each mission is transferred, and the content of a reward that can be obtained when the character is transferred is set on the basis of the statuses of the character that satisfies the recruitment conditions, it is possible to increase the diversity of obtainable rewards, thus enabling to attract a player's interest.

In particular, in this embodiment, information included in the statuses of a character and related to the recruitment conditions for missions and information included in the statuses of the character and related to setting of rewards are different. Specifically, the recruitment conditions for missions are set by the parameters such as the speed, the various types of aptitudes such as the distance aptitude, and the possessed skills, which are included in the statuses of the character, whereas the content of rewards is set by the evaluation points (or the rank based on the evaluation points), which are included in the statuses of the character. Thus, according to this embodiment, since it is not always that a good reward can be obtained even if training for increasing a particular status is performed in order to satisfy the recruitment conditions for a mission, various ingenuities in training of characters are required, thus making it possible to increase a player's interest in the training function.

Furthermore, in this embodiment, in the character selection screen, which serves as an input interface for accepting an input for specifying a character as a transfer target, the content of a reward for a character specified as a transfer target is displayed. Then, in this embodiment, since the player can select a transfer target while confirming the content of the reward on the character selection screen, it is possible to enhance the convenience for the player to perform an input.

Furthermore, in this embodiment, in the character selection screen, among the characters registered in the character list, a character icon of a character that does not satisfy the recruitment conditions for the mission is grayed out, and, with the character icon thereof being set in the specified state, it is impossible to advance to transfer confirmation. Thus, while the player is selecting a character to be a transfer target on the character selection screen, an unnecessary screen transition can be prevented from occurring. Note that the same advantageous effect can be obtained by performing control such that a character icon that is grayed out in the character selection screen is not set in the specified state or by not displaying a character that does not satisfy the recruitment conditions, in the character selection screen.

Furthermore, in this embodiment, although the server 20 sends the result of setting rewards for transferable characters, as a reply to a mission acquisition request sent from the player terminal 40 when the game mode of the special-transfer function is selected, it is also possible that, as a reply from the server 20 to the mission acquisition request, the player terminal 40 is made to obtain the result of extraction of characters that satisfy the recruitment conditions, and, when a mission is selected in the mission selection screen at the player terminal 40, the input accepting unit 61 sends a mission selection notification including the mission ID of the selected mission to the server 20, and the server 20 sends the result of setting the content of rewards for transferable characters to the player terminal 40 as a reply to the mission selection notification. Furthermore, it is also possible that, when the mission acquisition request is received, the reward-content setting unit 62 of the server 20 performs only extraction of characters that satisfy the recruitment conditions, without performing setting of rewards for the characters, sets the content of rewards for transferable characters linked with the mission ID on the basis of the fact that a mission selection notification is received, and sends the setting result to the player terminal 40. Furthermore, processing for setting the content of a reward for a transferable character may be performed at the timing when a tap input is performed on the corresponding character icon in the character selection screen. For example, when a tap input is performed on a character icon in the character selection screen, the player terminal 40 may send a reward setting request containing the character individual ID of the character corresponding to the character icon to the server 20. When the reward setting request is received at the server 20, the reward-content setting unit 62 may set the content of a reward by referring to the statuses of the character corresponding to the character individual ID contained in the reward setting request and may send the setting result related to the content of the reward to the player terminal 40 as a reply to the reward setting request.

Furthermore, in this embodiment, although, when a reward is set for a character that satisfies the recruitment conditions for a mission, the reward content is uniquely set depending on the statuses of the character, it is also possible to set the reward content by performing predetermined lottery processing in a lottery mode in accordance with the statuses of the character. In this case, it is possible to adopt a mode in which the type of a reward serving as a lottery target is different depending on the statuses of a character that satisfies the recruitment conditions or a mode in which the lottery rate for a reward is different depending on the statuses of a character that satisfies the recruitment conditions.

Note that, in the case where a reward to be obtained when a character is transferred is decided through a lottery, it is possible that a lottery is performed individually on items serving as rewards, and an item obtained by winning the lottery is associated with the character as a reward. Furthermore, it is also possible that a lottery is performed on, as a lottery target, a set of items etc. serving as a reward, and a set obtained by winning the lottery is associated with the character as a reward.

Furthermore, in this embodiment, although a description has been given of an example case in which the cool time is made to occur as a period from when transfer of a character that satisfies the recruitment conditions for a mission is decided to when a reward is given, the cool time may be made to occur as a period from when a reward is given after transfer of a character is decided to when the next mission can be performed.

Furthermore, in the case where there are no transferable characters in the character selection screen, for example, in the case where, even if there are characters that satisfy the recruitment conditions, the characters are all set in the locked state, it is possible that a button for guiding to the training function is displayed, and, when a tap input is performed on the button, a transition is made to the game mode of the training function. By doing so, training of a character to be transferred in the special-transfer function can be quickly started, thus making it possible to enhance the convenience for the player to perform an input.

Furthermore, in this embodiment, although processing for setting the content of rewards for characters that satisfy the recruitment conditions for missions is executed in the case where a mission acquisition request is received from the player terminal 40, it is also possible that, when the statuses of a character are determined after training thereof is completed in the training function, processing for setting the content of a reward is performed by referring to the determined statuses. Furthermore, in this embodiment, although processing for setting the content of rewards for characters that satisfy the recruitment conditions for missions is executed at the server 20, the processing may be executed at the player terminal 40.

Furthermore, regarding the server 20, a function of setting missions and a function of setting the content of rewards for characters may be realized at a single server 20, or the individual functions may be distributed to a plurality of servers 20 and realized at the separate servers 20.

Furthermore, it is also possible that, in the character selection screen, display-target characters are extracted in accordance with the content of rewards, to enable a transfer-target character to be specified from the list of characters based on the ranks of the rewards. In this embodiment, since three ranks of rewards are provided at maximum, categories "large", "middle", and "small" are set in the order of better rewards in accordance with the content of rewards, a category "none" is also provided for characters that are not transferable characters, trained characters possessed by the player are grouped into these categories, and character icons of display-target characters in the corresponding category can be displayed in the character selection screen.

Figure 16:
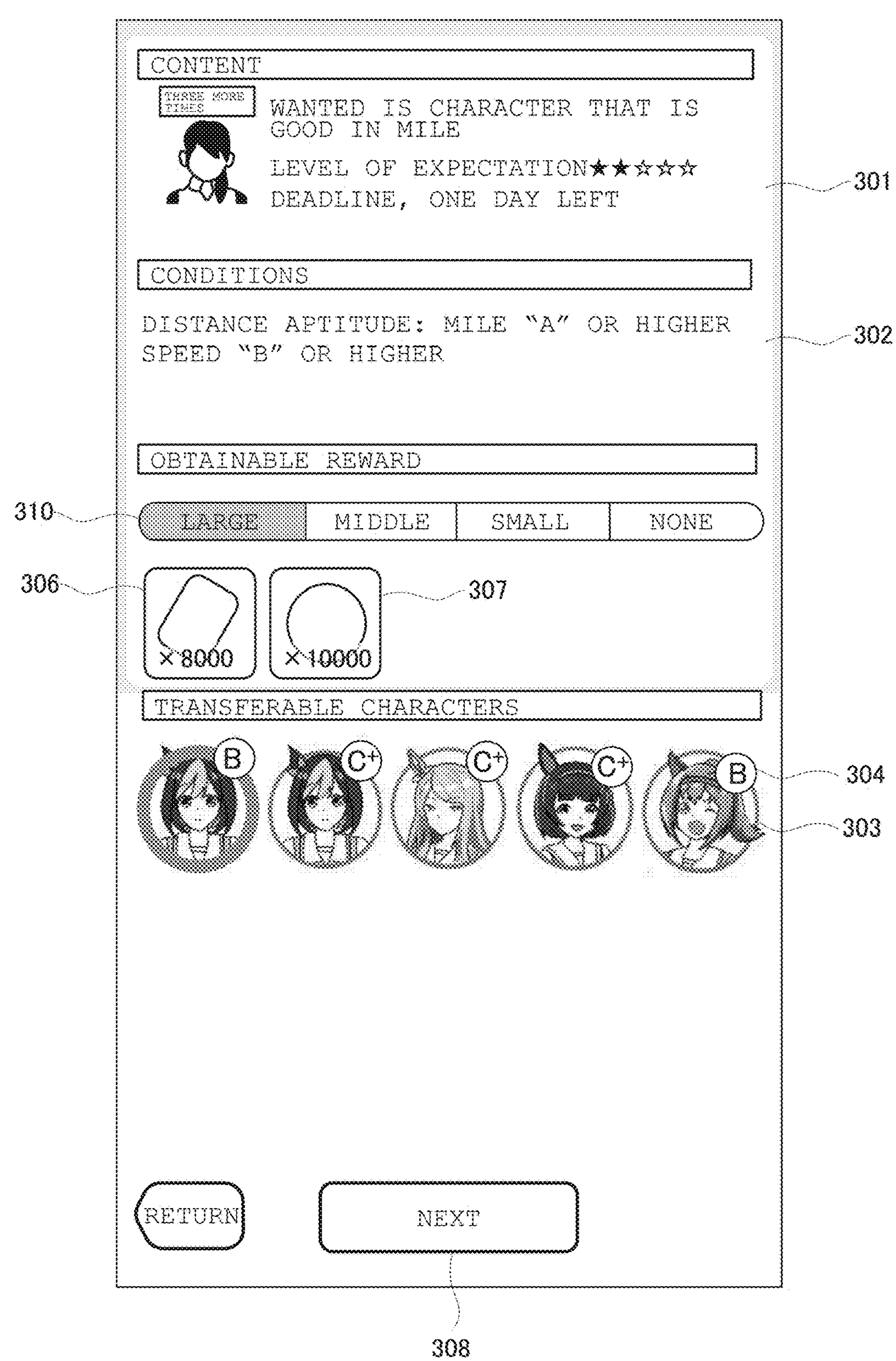
FIG. 16 is a view showing one example of the mission selection screen displayed at the player terminal.
Figure 17:
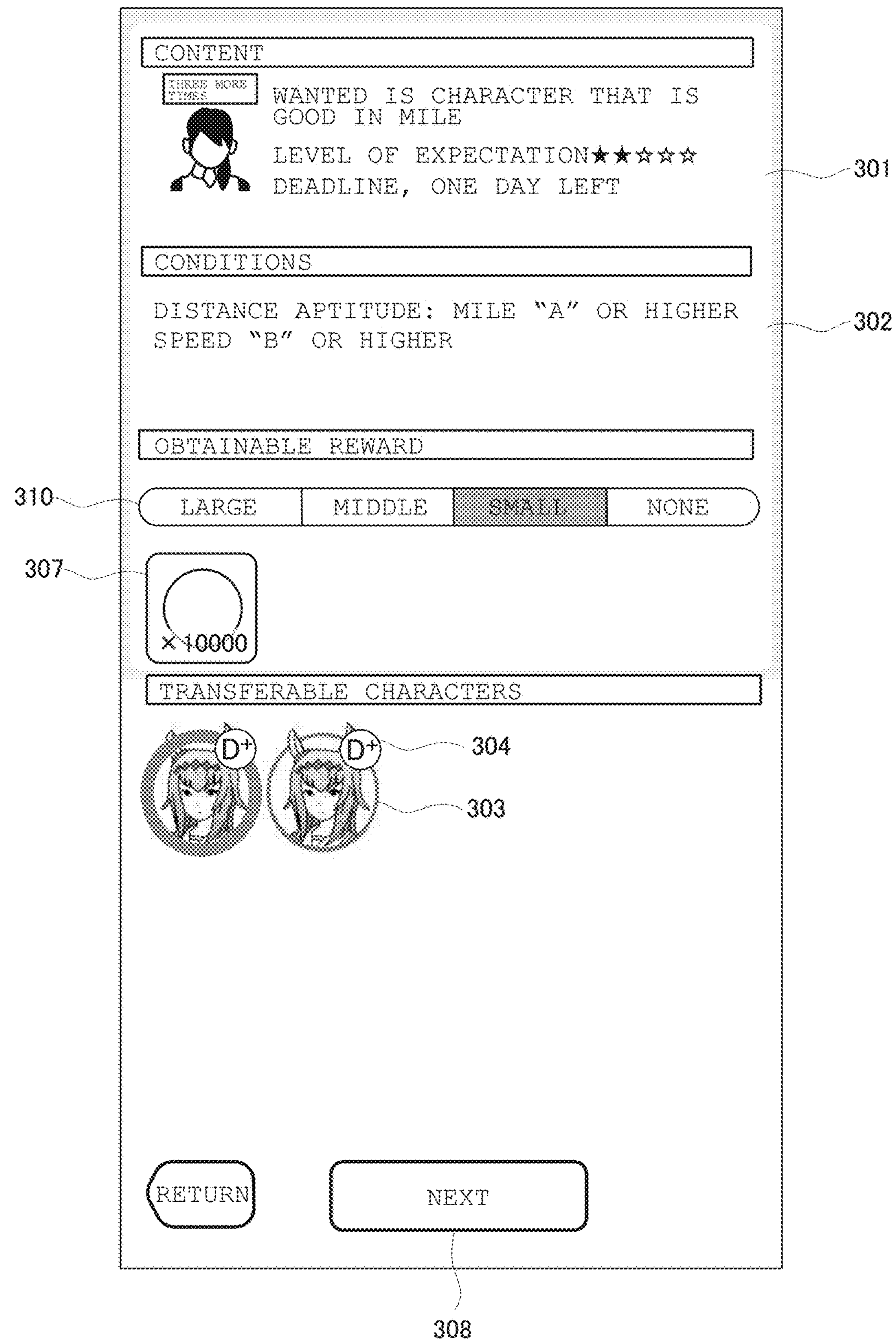
FIG. 17 is a view showing one example of the character selection screen displayed at the player terminal.
Figure 18:
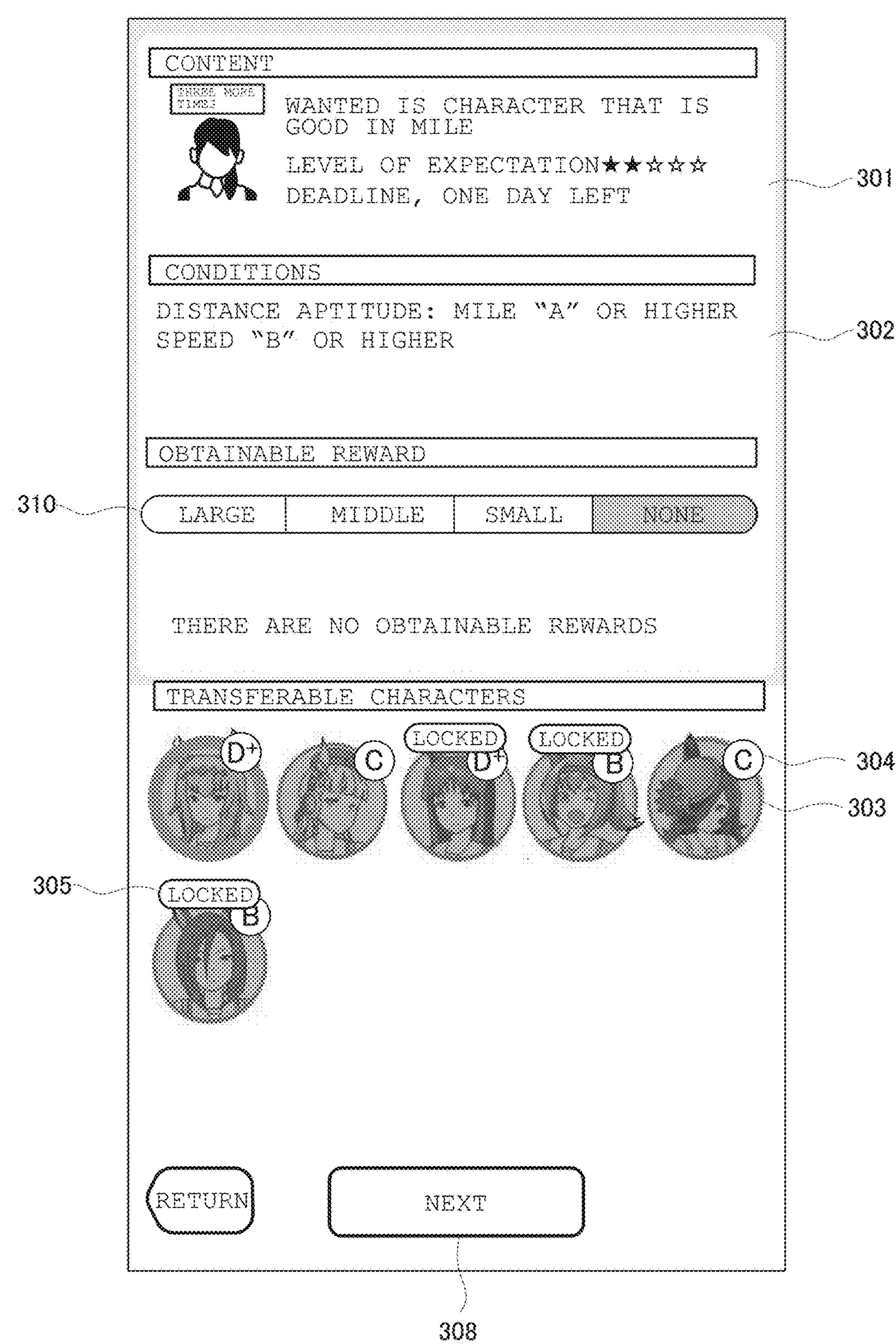
FIG. 18 is a view showing one example of the character selection screen displayed at the player terminal.

FIGS. 16 to 18 are views showing display examples of the character selection screen in the case where display-target characters are extracted in accordance with the content of rewards.

In this example, as shown in FIG. 16, reward selection tabs 310 corresponding to the content of rewards are provided, and display-target characters can be switched while the content of rewards are switched by a tap input performed on any of the reward selection tabs. For example, in the case shown in FIG. 16, "large" is selected for the content of rewards, the icon 306 indicating the enhancement points×8000 and the icon 307 indicating the in-game currency×10000, which are the content of rewards corresponding to the category "large", are displayed, transferable characters associated with the rewards are extracted, and only character icons thereof are displayed.

Then, when a tap input is performed on the reward selection tab 310 corresponding to the category "small", as shown in FIG. 17, the icon 307 indicating the in-game currency×10000, which is the content of a reward corresponding to the category "small", is displayed, transferable characters associated with the reward are extracted, and only character icons thereof are displayed.

Furthermore, when a tap input is performed on the reward selection tab 310 corresponding to the category "none", as shown in FIG. 18, a message "there are no rewards to be given" is displayed, characters that are not transferable characters, e.g., characters that do not satisfy the recruitment conditions and characters that are set in the locked state, are extracted, and only character icons thereof are displayed. Note that, with the reward selection tab 310 corresponding to the category "none" being selected, the content of a reward (here, in the category "small") serving as the minimum guarantee of a selected mission may also be displayed.

Furthermore, in this embodiment, although a description has been given of an example game in which characters used for performing a race are trained, and any of the training characters is consumed, thereby making it possible to get a reward, it is also possible to provide the individual functions of the information processing system 10 in another game. For example, the present invention can be applied to a game, in a sport game such as a baseball game or a soccer game, in which characters to be made to participate in a competition are trained, and any of the trained characters is consumed, thereby making it possible to get a reward. Furthermore, the present invention may also be applied to a game, in another genre of game, for example, a fighting game, an action game, a battle royale game, or a roll playing game, in which characters are trained, and any of the trained characters is consumed, thereby making it possible to get a reward. Furthermore, a game medium serving as a consumption target is not limited to a character. For example, it is also possible that the present invention can be applied to a game in which there are elements (for example, level up, evolution, etc.) for changing the statuses of accessories (for example, weapons, protectors, or the like) and items, and an accessory or an item is consumed, thereby making it possible to get a reward corresponding to the statuses of the consumption target.

The invention claimed is:

1. A non-transitory computer-readable information storage medium storing a program, the program, when executed by a computer, is configured to perform a method comprising:

displaying, on a display unit in a player terminal, a character selection screen that provides a graphical user interface for accepting one or more player inputs using an input unit for specifying a first game medium possessed by a player as a consumption target, wherein the player terminal comprises a processor, the display unit, and the input unit, and wherein the character selection screen displays a content of a reward for the first game medium specified as the consumption target;

setting, by the player terminal, a specific condition that is satisfied by the first game medium in order to get the reward within a computer game;

setting, by the player terminal, the content of the reward based on information linked with the first game medium that satisfies the specific condition;

receiving, in response to displaying the character selection screen and by the input unit of the player terminal, a first player input regarding the consumption target;

executing, by the player terminal and in response to receiving the first player input, the computer game in which the first game medium possessed by the player is consumed as the consumption target to obtain the reward, wherein the reward is obtained during execution of the computer game based on the first player input causing consumption of the first game medium and satisfying the specific condition.

2. The non-transitory computer-readable information storage medium according to claim 1, wherein the character selection screen makes, among a plurality of game media possessed by the player, a second game medium, which does not satisfy the specific condition, unable to be specified as the consumption target, in the character selection screen.

3. The non-transitory computer-readable information storage medium according to claim 1, wherein the program has a game mode in which a status of the first game medium is made to change in accordance with a progression of the computer game and in which the status of the first game medium is determined in response to a degree of progression of the computer game satisfying a predetermined completion condition; and wherein the specific condition is set in association with the status of the first game medium.

4. The non-transitory computer-readable information storage medium according to claim 1, wherein the program has a first game mode in which a status of the first game medium is made to change in accordance with a progression of the computer game and in which the status of the first game medium is determined in response to a degree of progression of the computer game satisfying a predetermined completion condition; and wherein the content of the reward is set by using the status determined in a second game mode that is different from the first game mode and as information linked with the first game medium.

5. The non-transitory computer-readable information storage medium according to claim 1, wherein the content of the reward is set for the first game medium by performing predetermined lottery processing based on information linked with the first game medium.

6. An information processing system comprising:

a hardware processor;

a display unit;

an input unit; and a memory connected to the hardware processor, wherein the memory comprises a program configured to perform a method comprising:

displaying, on the display unit, a character selection screen that provides a graphical user interface for accepting one or more player inputs using the input unit for specifying a first game medium possessed by a player as a consumption target, wherein the character selection screen displays a content of a reward for the first game medium specified as the consumption target;

setting a specific condition that is satisfied by the first game medium in order to get the reward within a computer game;

setting the content of the reward based on information linked with the first game medium that satisfies the specific condition;

receiving, in response to displaying the character selection screen and by the input unit, a first player input regarding the consumption target;

executing, in response to receiving the first player input, the computer game in which the first game medium possessed by the player is consumed as the consumption target to obtain the reward, wherein the reward is obtained during execution of the computer game based on the first player input causing consumption of the first game medium and satisfying the specific condition.

7. An information processing method comprising:

displaying, on a display unit in a player terminal, a character selection screen that provides a graphical user interface for accepting one or more player inputs using an input unit for specifying a first game medium possessed by a player as a consumption target, wherein the player terminal comprises a processor, the display unit, and the input unit, and wherein the character selection screen displays a content of a reward for the first game medium specified as the consumption target;

setting, by the player terminal, a specific condition that is satisfied by the first game medium in order to get the reward within a computer game;

setting, by the player terminal, the content of the reward based on information linked with the first game medium that satisfies the specific condition;

receiving, in response to displaying the character selection screen and by the input unit of the player terminal, a first player input regarding the consumption target;

executing, by the player terminal and in response to receiving the first player input, the computer game in which the first game medium possessed by the player is consumed as the consumption target to obtain the reward, wherein the reward is obtained during execution of the computer game based on the first player input causing consumption of the first game medium and satisfying the specific condition.

* * * * *